(12) United States Patent
Kolb et al.

(10) Patent No.: US 9,464,179 B2
(45) Date of Patent: Oct. 11, 2016

(54) PROCESS AND APPARATUS FOR A NANOVOIDED ARTICLE

(71) Applicant: 3M Innovative Properties Company, St. Paul, MN (US)

(72) Inventors: William B. Kolb, West Lakeland, MN (US); Encai Hao, Woodbury, MN (US); Brant U. Kolb, Afton, MN (US); David L. Phillips, White Bear Lake, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 14/324,313

(22) Filed: Jul. 7, 2014

(65) Prior Publication Data

US 2014/0323603 A1 Oct. 30, 2014

Related U.S. Application Data

(62) Division of application No. 13/262,933, filed as application No. PCT/US2010/028777 on Mar. 26, 2010, now Pat. No. 8,808,811.

(60) Provisional application No. 61/169,429, filed on Apr. 15, 2009.

(51) Int. Cl.
| | |
|---|---|
| *C08J 9/36* | (2006.01) |
| *C08J 9/28* | (2006.01) |
| *C08J 9/00* | (2006.01) |

(52) U.S. Cl.
CPC .............. *C08J 9/286* (2013.01); *C08J 9/0004* (2013.01); *C08J 2201/0502* (2013.01); *C08J 2205/042* (2013.01)

(58) Field of Classification Search
CPC .......... C08J 9/0004; C08J 9/286; C08J 9/36; C08J 2205/042; C08J 2201/0502
See application file for complete search history.

(56) References Cited

U.S. PATENT DOCUMENTS

| | | |
|---|---|---|
| 2,736,721 A | 2/1956 | Dexter |
| 2,801,185 A | 7/1957 | Iler |

(Continued)

FOREIGN PATENT DOCUMENTS

| | | |
|---|---|---|
| DE | 10-2007-063471 | 12/2008 |
| EP | 989443 | 3/2000 |

(Continued)

OTHER PUBLICATIONS

ASTM Designation: D 1003-00, "Standard Test Method for Haze and Luminous Transmittance of Transparent Plastics", 2000, pp. 198-203.

(Continued)

*Primary Examiner* — Elena T Lightfoot
(74) *Attorney, Agent, or Firm* — Robert V. Heiti; Lisa P. Fulton

(57) ABSTRACT

A process and apparatus for producing a nanovoided article, a nanovoided coating, and a low refractive index coating is described. The process includes providing a first solution of a polymerizable material in a solvent; at least partially polymerizing the polymerizable material to form a composition that includes an insoluble polymer matrix and a second solution, wherein the insoluble polymer matrix includes a plurality of nanovoids that are filled with the second solution; and removing a major portion of the solvent from the second solution. An apparatus for the process is also described, and includes a webline, a coating section, a partial polymerization section, and a solvent removal section.

15 Claims, 14 Drawing Sheets

(56) References Cited

U.S. PATENT DOCUMENTS

| | | |
|---|---|---|
| 2,976,576 A | 3/1961 | Wichterle |
| 4,379,201 A | 4/1983 | Heilmann |
| 4,522,958 A | 6/1985 | Das |
| 4,672,089 A | 6/1987 | Pricone |
| 4,696,719 A | 9/1987 | Bischoff |
| 4,737,559 A | 4/1988 | Kellen |
| 4,842,893 A | 6/1989 | Yializis |
| 4,889,632 A | 12/1989 | Svec |
| 4,923,610 A | 5/1990 | Svec |
| 4,952,349 A | 8/1990 | Svec |
| 4,954,371 A | 9/1990 | Yializis |
| 5,130,343 A | 7/1992 | Frechet |
| 5,214,119 A | 5/1993 | Leihr |
| 5,219,120 A | 6/1993 | Ehrenberg |
| 5,261,949 A | 11/1993 | Schilling |
| 5,413,853 A | 5/1995 | Imashiro |
| 5,593,729 A | 1/1997 | Frechet |
| 5,633,290 A | 5/1997 | Frechet |
| 5,677,050 A | 10/1997 | Bilkadi |
| 5,691,846 A | 11/1997 | Benson, Jr. |
| 5,694,701 A | 12/1997 | Huelsman |
| 5,728,457 A | 3/1998 | Frechet |
| 5,808,713 A | 9/1998 | Broer |
| 5,919,555 A | 7/1999 | Yasuda |
| 5,992,066 A | 11/1999 | Brauer |
| 6,012,647 A | 1/2000 | Ruta |
| 6,090,861 A | 7/2000 | Mendenhall et al. |
| 6,166,855 A | 12/2000 | Ikeyama |
| 6,177,131 B1 | 1/2001 | Glaubitt |
| 6,204,202 B1 | 3/2001 | Leung |
| 6,208,466 B1 | 3/2001 | Liu |
| 6,210,485 B1 | 4/2001 | Zhao |
| 6,210,858 B1 | 4/2001 | Yasuda |
| 6,245,150 B1 | 6/2001 | Lyons |
| 6,368,699 B1 | 4/2002 | Gilbert |
| 6,383,559 B1 | 5/2002 | Nakamura |
| 6,413,882 B1 | 7/2002 | Leung |
| 6,455,103 B1 | 9/2002 | Mennig |
| 6,457,823 B1 | 10/2002 | Cleary |
| 6,521,047 B1 | 2/2003 | Brutii |
| 6,573,305 B1 | 6/2003 | Thunhorst |
| 6,683,421 B1 | 1/2004 | Kennedy |
| 6,703,463 B2 | 3/2004 | Holguin |
| 6,759,080 B2 | 7/2004 | Thunhorst |
| 6,780,327 B1* | 8/2004 | Wu et al. ............. 210/660 |
| 6,797,396 B1 | 9/2004 | Liu |
| 6,846,089 B2 | 1/2005 | Stevenson |
| 6,867,275 B2* | 3/2005 | Alexander et al. ........... 526/336 |
| 6,890,642 B2 | 5/2005 | Kaminsky |
| 6,924,014 B2 | 8/2005 | Ouderkirk |
| 6,958,860 B2 | 10/2005 | Dontula |
| 7,032,324 B2 | 4/2006 | Kolb |
| 7,099,083 B2 | 8/2006 | Johnson |
| 7,108,810 B2 | 9/2006 | Nakamura |
| 7,132,136 B2 | 11/2006 | Laney |
| 7,137,696 B2 | 11/2006 | Siegel |
| 7,185,993 B2 | 3/2007 | Smith |
| 7,204,616 B2 | 4/2007 | Kitamura |
| 7,241,478 B2 | 7/2007 | McNeish |
| 7,309,135 B2 | 12/2007 | Smith |
| 7,327,415 B2 | 2/2008 | Brickey |
| 7,361,474 B2 | 4/2008 | Siegler |
| 7,371,464 B2 | 5/2008 | Sherman |
| 7,372,075 B2 | 5/2008 | Shigemura |
| 7,431,888 B2 | 10/2008 | Frechet |
| 7,466,373 B2 | 12/2008 | Xu |
| 7,547,105 B2 | 6/2009 | Bacon |
| 2003/0116270 A1 | 6/2003 | Hawa |
| 2003/0138555 A1 | 7/2003 | Debe |
| 2003/0148024 A1 | 8/2003 | Kodas |
| 2003/0170442 A1 | 9/2003 | Kaminsky |
| 2004/0164325 A1 | 8/2004 | Siegel |
| 2005/0116179 A1 | 6/2005 | Aguirre |
| 2005/0214453 A1 | 9/2005 | Kawanishi |
| 2005/0261389 A1 | 11/2005 | Bratolavsky |
| 2006/0014012 A1 | 1/2006 | Thies |
| 2006/0019114 A1 | 1/2006 | Thies |
| 2006/0082700 A1 | 4/2006 | Gehlsen |
| 2006/0151742 A1 | 7/2006 | Hegi |
| 2006/0246233 A1 | 11/2006 | Fukuda |
| 2006/0275595 A1 | 12/2006 | Thies |
| 2007/0020404 A1 | 1/2007 | Seiberle |
| 2007/0065638 A1 | 3/2007 | Wang |
| 2007/0110983 A1 | 5/2007 | Jahromi |
| 2007/0134939 A1 | 6/2007 | Brueck |
| 2007/0189038 A1 | 8/2007 | Pokorny |
| 2007/0286993 A1 | 12/2007 | Radcliffe |
| 2008/0037127 A1 | 2/2008 | Weber |
| 2008/0070029 A1* | 3/2008 | Hessing et al. ............. 428/319.3 |
| 2008/0192352 A1 | 8/2008 | Laney |
| 2008/0214075 A1 | 9/2008 | Marte |
| 2008/0220554 A1 | 9/2008 | Shigemura |
| 2008/0248312 A1 | 10/2008 | Thies |
| 2008/0305282 A1 | 12/2008 | Inakura |
| 2009/0029145 A1 | 1/2009 | Thies |
| 2009/0074976 A1 | 3/2009 | Freking |
| 2009/0092676 A1* | 4/2009 | Richard et al. ............... 424/501 |
| 2012/0039089 A1 | 2/2012 | Hao |
| 2012/0076860 A1* | 3/2012 | Trout et al. ................. 424/489 |

FOREIGN PATENT DOCUMENTS

| | | |
|---|---|---|
| EP | 1002830 | 5/2000 |
| EP | 1022587 | 6/2007 |
| EP | 1479734 | 2/2009 |
| FR | 2629187 | 3/1988 |
| GB | 1188736 | 4/1970 |
| JP | 63-295653 | 12/1988 |
| JP | 07-316336 | 5/1995 |
| JP | 2003-034778 | 2/2003 |
| JP | 2005-266343 | 9/2005 |
| JP | 2007-245102 | 9/2007 |
| JP | 2008-003243 | 1/2008 |
| JP | 2008-025173 | 7/2008 |
| JP | 2008-212832 | 9/2008 |
| JP | 2009-082890 | 4/2009 |
| WO | WO 01-04954 | 1/2001 |
| WO | WO 03-064304 | 8/2003 |
| WO | WO 2004-026783 | 4/2004 |
| WO | 2006-030920 | 3/2006 |
| WO | WO 2006-031102 | 3/2006 |
| WO | WO 2006-096258 | 9/2006 |
| WO | WO 2007-018423 | 2/2007 |
| WO | WO 2007-031539 | 3/2007 |
| WO | WO 2007-031541 | 3/2007 |
| WO | WO 2007-065847 | 6/2007 |
| WO | WO 2007-146722 | 12/2007 |
| WO | WO 2008-011919 | 1/2008 |
| WO | WO 2010-120422 | 10/2010 |
| WO | WO 2010-120845 | 10/2010 |
| WO | WO 2010-120864 | 10/2010 |
| WO | WO 2010-120971 | 10/2010 |
| WO | WO 2010-121019 | 10/2010 |
| WO | WO 2011-050254 | 4/2011 |

OTHER PUBLICATIONS

Bakry, "Monolithic Porous Polymer Layer for the Separation of Peptides and Proteins using thin layer chromatography coupled with MALDI-TOF-MS", Anal. Chem. Jan. 15, 2007, vol. 79, pp. 486-493.

Dulay, "Photopolymerized Sol-Gel Monoliths for Capillary Electrochromatography", Anal. Chem., Aug. 15, 2001, vol. 73, No. 16, pp. 3921-3926.

Ibn-Elhaj, Nature, "Optical polymer thin films with isotropic and anisotropic nano-corrugated surface topologies", Letters of Nature, Apr. 12, 2011, vol. 410, pp. 796-799.

Kemsley, "Modernizing TLC, New instrumentation, materials, and analysis techniques take lab staple into high-performance arena", C&EN, May 18, 2009, vol. 87, No. 20, pp. 11-18.

(56) References Cited

OTHER PUBLICATIONS

Oliveri, "Fabrication and Characterization of Polymeric Optical Waveguides Using Standard Silicon Processing Technology", Fibres and Optical Passive Components, Proceedings of 2005/IEEE/LEOS Workshop on Jun. 22-24, 2005, pp. 1-6.

Peng, "Enhanced coupling of light from organic light emitting diodes using nanoporous films", Journal of Applied Physics, Aug. 1, 2004, vol. 96, No. 3, pp. 1649-1654.

Rohr, "Photografting and the Control of Surface Chemistry in Three-Dimensional Porous Polymer Monoliths", Macromolecules, 2003, vol. 36, No. 5, pp. 1677-1684.

Schmidt, "Templated Cross-Linking Reactions for Designing NanoPorous Materials", Materials & Science Engineering, 2007, vol. C 27, No. 5-8 pp. 1487-1490.

Svec, "Monolithic materials promises, challenges, achievements", Analytical Chemistry, Apr. 1, 2006, pp. 2101-2107.

Tennikova, "High performance membrane chromatography of proteins. A novel method of protein separation", J. Chromatography, 1991, vol. 555, pp. 97-107.

Tennikova, "High performance membrane chromatography. A novel method of protein separation", J. Liquid Chromatography, 1990, vol. 13, No. 1, pp. 63-70.

Tsutsui, "Doubling Coupling-Out Efficiency in Organic Light-Emitting Devices Using a Thin Silica Aerogel Layer", Advanced Materials, Aug. 3, 2001, vol. 13, No. 15, pp. 1149-1152.

Viklund, "Molded" macroporous poly(glycidyl methacrylate-co-trimethylolpropane trimethacrylate) materials with fine controlled porous properties: preparation on monoliths using photoinitiated polymerization, Chem. Mater., 1997, vol. 9, No. 2, pp. 463-471.

Walheim, "NanoPhase-Separated Polymer Films as High-Performance AntiReflection Coatings", Science, Jan. 22, 1999, vol. 283, pp. 520-522.

Wang, "Formation of porous epoxy monolith via concentrated emulsion polymerization", J. Colloid and Interface Science, 2008, vol. 325, pp. 453-458.

Yu, "Preparation of Monolithic Polymers with Controlled Porous Properties for Microfluidic Chip Applications Using Photoinitiated Free-Radical Polymerization", Journal of Polymer Science, 2002, vol. 40, No. 6, pp. 755-769.

International Search Report for PCT/US2010/028777, mailed Aug. 16, 2010, 4 pages.

Written Opinion for PCT/US2010/028777, mailed Aug. 16, 2010, 8 pages.

International Search Report for PCT/US2010/031010, mailed Aug. 17, 2010, 8 pages.

Written Opinion for PCT/US2010/031010, mailed Aug. 17, 2010, 12 pages.

International Search Report for PCT/US2010/027433, mailed Sep. 1, 2010, 8 pages.

Written Opinion for PCT/US2010/027433, mailed Sep. 1, 2010, 15 pages.

U.S. Appl. No. 61/013,617, filed Dec. 13, 2007, entitled Hydrophilic Gel Materials and Methods of Making the Same by Non-contact Deposition.

U.S. Appl. No. 61/169,427, filed Apr. 15, 2009, entitled Process and Apparatus for Coating with Reduced Defects.

U.S. Appl. No. 61/169,429, filed Apr. 15, 2009, entitled Process and Apparatus for a Nanovioided Article.

U.S. Appl. No. 61/169,466, filed Apr. 15, 2009, entitled Optical Film.

U.S. Appl. No. 61/169,521, filed Apr. 15, 2009, entitled Optical Construction and Display System Incorporating Same.

U.S. Appl. No. 61/169,532, filed Apr. 15, 2009 entitled Retroreflecting Optical Construction.

U.S. Appl. No. 61/169,549, filed Apr. 15, 2009 entitled Optical Film for Preventing Optical Coupling.

U.S. Appl. No. 61/169,555, filed Apr. 15, 2009, entitled Backlight and Display System Incorporating Same.

U.S. Appl. No. 61/294,600, filed Jan. 13, 2010, entitled Microstructured Low Refractive Index Articles.

\* cited by examiner

PROCESS AND APPARATUS FOR A NANOVOIDED ARTICLE

CROSS REFERENCE TO RELATED APPLICATIONS

This application is a divisional of U.S. application Ser. No. 13/262,933, filed Oct. 5, 2011, now U.S. Pat. No. 8,808,811, which claims priority to U.S. Provisional Application No. 61/169,429, filed Apr. 15, 2009, the disclosure of which is incorporated by reference in their entirety herein.

BACKGROUND

Articles having a structure of nanometer sized pores or voids can be useful for several applications based on optical, physical, or mechanical properties provided by their nanovoided composition. For example, a nanovoided article includes a polymeric solid network or matrix that at least partially surrounds pores or voids. The pores or voids are often filled with a gas such as air. The dimensions of the pores or voids in a nanovoided article can generally be described as having an average effective diameter which can range from about 1 nanometer to about 1000 nanometers. The International Union of Pure and Applied Chemistry (IUPAC) have provided three size categories of nanoporous materials: micropores with voids less than 2 nm, mesopores with voids between 2 nm and 50 nm, and macropores with voids greater than 50 nm. Each of the different size categories can provide unique properties to a nanovoided article.

Several techniques have been used to create porous or voided articles, including for example polymerization-induced phase separation (PIPS), thermally-induced phase separation (TIPS), solvent-induced phased separation (SIPS), emulsion polymerization, and polymerization with foaming/blowing agents. Often, the porous or voided article produced by these methods requires a washing step to remove materials such as surfactants, oils, or chemical residues used to form the structure. The washing step can limit the size ranges and uniformity of the pores or voids produced. These techniques are also limited in the types of materials that can be used. There is a need for a rapid, reliable technique for producing nanovoided articles that does not require a washing step.

SUMMARY

In one aspect, the present disclosure provides a process for producing a nanovoided article. The process includes providing a first solution that includes a polymerizable material in a solvent and at least partially polymerizing the polymerizable material to form a composition comprising an insoluble polymer matrix and a second solution. The insoluble polymer matrix includes a plurality of nanovoids that are filled with the second solution. The process further includes removing a major portion of the solvent from the second solution.

In another aspect, the present disclosure provides a process for producing a nanovoided coating. The process includes coating a first solution on a substrate. The first solution includes a polymerizable material in a solvent. The process further includes at least partially polymerizing the polymerizable material to form an insoluble polymer matrix bicontinuous with a plurality of nanovoids and a second solution; the plurality of nanovoids being filled with the second solution. The process further includes removing a major portion of the solvent from the second solution.

In another aspect, the present disclosure provides a process for producing a low refractive index coating. The process includes coating a dispersion on a substrate. The dispersion includes an ultraviolet (UV) radiation curable material, a photoinitiator, a solvent, and a plurality of nanoparticles. The process further includes irradiating the dispersion with UV radiation to at least partially polymerize the radiation curable material, forming an insoluble polymer matrix binding the plurality of nanoparticles, and including a plurality of nanovoids filled with the dispersion depleted of the polymerizable material and the nanoparticles. The process further includes removing a major portion of the solvent from the dispersion after at least partially polymerizing the polymerizable material.

In another aspect, the present disclosure provides an apparatus for producing a nanovoided coating. The apparatus includes a webline for conveying a substrate downweb from an unwind roll to a windup roll. The apparatus further includes a coating section disposed proximate the unwind roll and capable of coating a first solution having a polymerizable material in a solvent onto the substrate. The apparatus further includes a polymerization section disposed downweb from the coating section and capable of at least partially polymerizing the polymerizable material to form a composition that includes an insoluble polymer matrix and a second solution. The insoluble polymer matrix includes a plurality of nanovoids filled with the second solution. The apparatus further includes a solvent removal section disposed downweb from the polymerization section, capable of removing a major portion of the solvent from the second solution.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
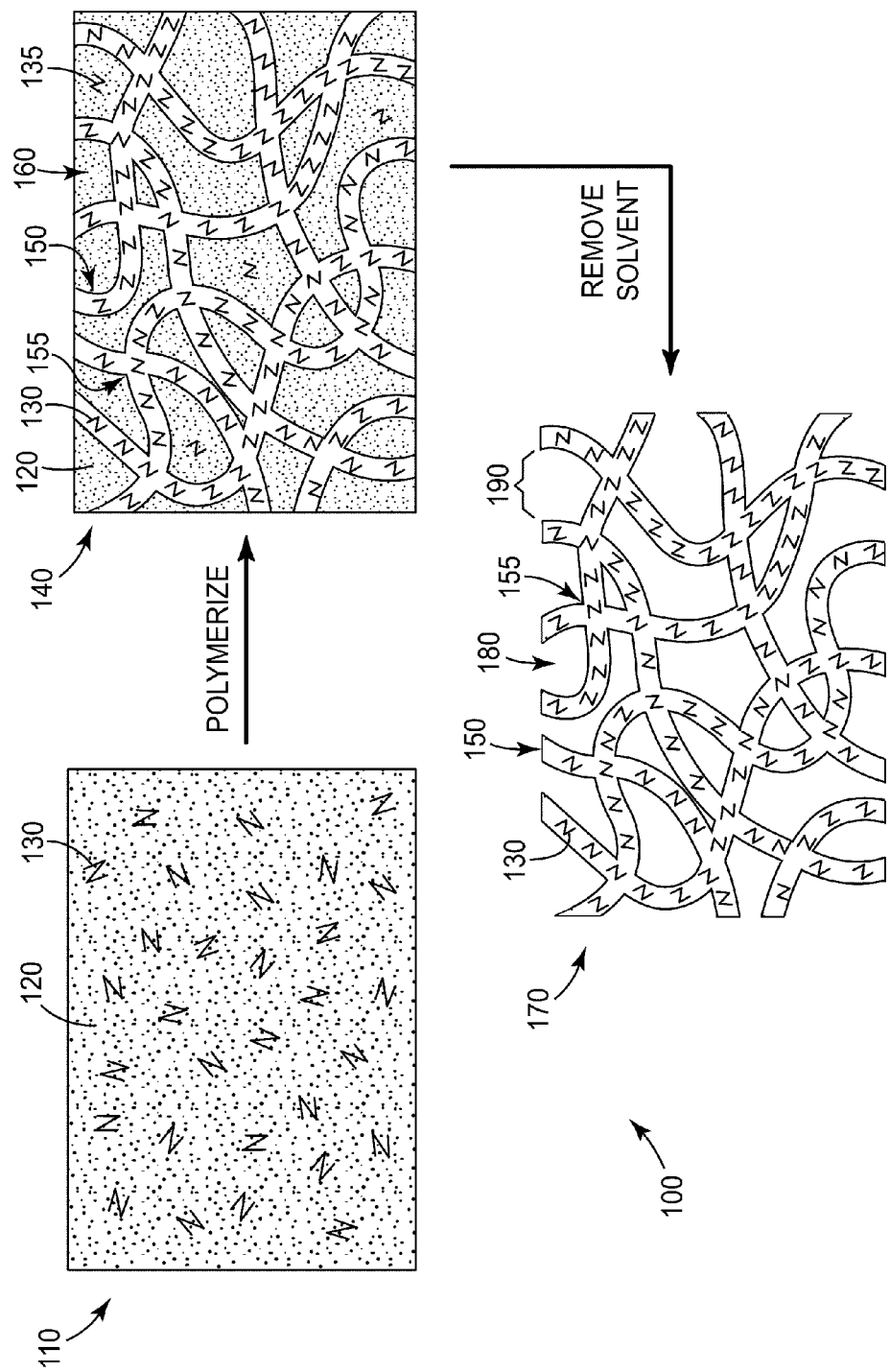
FIG. 1 is a schematic view of a process for forming a nanovoided article.

A unique process and apparatus for creating nanovoided articles having unique morphologies is described. The process is directed to polymerization of materials in a solution, while solvent is present within the solution. The materials can be thermally polymerized, or they can be polymerized using actinic radiation. A solution including radiation-curable materials in a solvent can be particularly well suited to the production of a nanovoided article. The solvent can be a mixture of solvents, and particularly well suited solvent(s) are those that are not reactive with the polymerizable materials. During polymerization, the solvent solubility of the formed polymer decreases and it separates from the solution, resulting in an insoluble polymer matrix and a phase separated solvent rich network. The solvent is subsequently removed, leaving pores and voids which yield the nanovoided article. The solution can be coated on a substrate to provide a nanovoided coating on the substrate. In some embodiments, the substrate can be subsequently removed leaving a nanovoided article.

Generally, as used herein, "pores" and "voids" refer to the polymer-free regions within a nanovoided article that can be either partially, or totally, surrounded by the polymer matrix. "Void" is a broader term that refers to any polymer-free region, no matter how small in volume, and is only limited by the size of the nanovoided article. "Pore" is a subset of "void," and generally refers to a polymer-free region that extends substantially through the polymer matrix. A "pore" can be extensive throughout the nanovoided article, and in some embodiments connects one surface of the article to the other, as described elsewhere.

The effective diameter of any pore or void can be related to the diameter of a circle having the same cross-sectional area as the pore or void, and this effective diameter can be averaged over the dimensions of the article to provide an average effective diameter. Nanovoided articles can be "open-cell" structures, in which the pores or voids are in communication with the environment surrounding the article. Alternatively, nanovoided articles can be "closed-cell" structures in which the pores or voids are surrounded by the solid network or matrix, sealing them from the environment surrounding the article. In many cases, nanovoided articles include a combination of open-cell and closed-cell structures.

The average effective diameters of pores and voids in a nanovoided article can generally range in sizes less than about 1000 nm, less than 100 nm, or even less than about 10 nm. In some applications, particularly applications including interactions with light, the average effective diameter of the pores and voids are comparable in size to the wavelength of light used. Several exemplary nanovoided articles and uses for the nanovoided articles can be found, for example, in co-pending U.S. application Ser. No. 13/264,325, entitled OPTICAL FILM; Ser. No. 13/264,654, entitled BACK-LIGHT AND DISPLAY SYSTEM INCORPORATING SAME; Ser. No. 13/264,254, entitled OPTICAL FILM FOR PREVENTING OPTICAL COUPLING; Ser. No. 13/264,281, entitled OPTICAL CONSTRUCTION AND DISPLAY SYSTEM INCORPORATING SAME; and Ser. No. 12/760,738, entitled RETROREFLECTING OPTICAL CONSTRUCTION, all filed on an even date herewith. The use of the nanovoided article can be dependent on the mechanical properties of the polymer matrix. In one particular embodiment, the polymer matrix modulus and strength are sufficient to maintain a void space as the solvent is removed.

In some embodiments, the polymer matrix modulus and strength are insufficient to maintain a void space after the solvent is removed, resulting in a "collapsed" coating without nanovoids. In one such embodiment, the homogeneous composition includes a polymer gel. A polymer gel is a polymer network that is expanded throughout its whole volume by a fluid (in this case the solvent), but is not self-supporting after removal of the solvent. Such a collapsed coating can provide improvements in the production of a homogeneous coating with reduced coating defects, as described for example in U.S. application Ser. No. 13/258,029, entitled PROCESS AND APPARATUS FOR COATING WITH REDUCED DEFECTS, filed on an even date herewith.

The present process permits the ability to control the distribution of the pores throughout the article. For example, the pores and voids in the nanovoided article can be uniformly dispersed throughout the article, non-uniformly dispersed such as in a gradient, or they can vary in size, shape, and distribution throughout the article. In one particular embodiment, at least a portion of the pores and voids are continuous throughout the article, i.e., there is a continuous but potentially tortuous path connecting each pore and void to the surfaces of the article. The continuous path (often resulting from a bicontinuous phase) permits ready removal of solvent from the article, rather than the solvent becoming trapped in a closed-cell structure during polymerization of the polymer matrix.

In one particular embodiment, the polymerization apparatus uses recently developed ultraviolet light emitting diode (UV LED) systems. UV LED systems can be small in size and radiate very little infrared radiation, which can result in less heating of the coating. These characteristics make it safe and practical to expose UV-curable compositions in an environment where a coating solvent is present. UV LED systems can be configured to operate at several desired peak wavelengths, such as 365 nm, 385 nm, 395 nm, 405 nm, and the like. Other radiation sources may be used, such as, for example, UV lasers, UV lamps, visible lamps, flashlamps, and the like; other high-energy particle devices can be used, including, for example, electron-beam (EB) sources and the like.

The polymerization can occur rapidly, and the polymerization apparatus can be placed between a coating station and conventional solvent removal system. The polymerization apparatus can also be placed within conventional drying equipment or between a series of conventional drying equipment, as long as there is still a significant portion of the solvent present within the coated film at the onset of cure.

Processing parameters can affect the resulting nanovoided article, including, for example, web speed, coating thickness, UV LED spectrum and peak wavelength, intensity, dose, temperature, and composition of the coating at the onset of polymerization. Other processing parameters that can affect the resulting nanovoided article include composition of the coating during polymerization, and environmental control, including, for example, gas phase composition, gas flow fields, and gas flow rates. Gas phase composition can include both solvent composition and concentration, and oxygen concentration particularly near the polymerization region. Control of the coated film environment from coating application through the polymerization process is desired, and can be accomplished with temperature-controlled enclosures with both supply and removal of conditioned gas. In some cases, simultaneous curing (polymerization) and drying can occur. The drying technique may also affect the thin film morphology and uniformity.

The polymer matrix should have sufficient modulus and mechanical integrity to maintain a void space after removal of the solvent. In some embodiments, the polymer matrix is a crosslinked matrix, such as a three-dimensional polymeric matrix, that resists deformation during and after solvent removal. Particulate fillers (e.g., particles such as nanoparticles) can be added to the polymer matrix to affect the formation and strength of the nanovoided article. In some cases, the addition of nanoparticles can increase the effective modulus of the polymerized material, increase or decrease the pore/void average effective diameter and distribution throughout the article, decrease the conversion of the polymerizable material at the gel point, increase the viscosity of the solution before and during cure, or a combination of these and other effects.

In some embodiments, the process for creating the nanovoided coatings generally includes 1) supplying the solution to a coating device; 2) applying the coating solution to a substrate by one of many coating techniques; 3) transporting the coated substrate to a polymerization apparatus (the environment can be controlled to deliver the thin film coating at the desired composition); 4) at least partially polymerizing while solvent is present within the coating (the polymerization can be performed in ambient conditions or in controlled environments); 5) optionally supplying conditioned gas upstream, downstream, or within the polymerization apparatus to control the polymerization environment; 6) transporting the polymerized coating to drying equipment (drying can naturally occur during this transport step unless equipment is in place to prevent it); 7) drying the polymerized coating; and 8) optionally post-processing the dried polymerized coating, for example, by additional thermal, visible, UV, or EB curing.

FIG. 1 shows a schematic view of a process 100 for forming a nanovoided article 170 according to one aspect of the disclosure. A first solution 110 that includes a polymerizable material 130 in a solvent 120 is provided. The polymerizable material 130 of the first solution 110 is at least partially polymerized to form a composition 140 that includes an insoluble polymer matrix 150 in a second solution 160. A major portion of the solvent 120 is removed from the second solution 160 to form the nanovoided article 170. The second solution 160 is depleted of the polymerizable material 130; however, some polymerizable material 130 can remain in the second solution 160, as described elsewhere. Nanovoided article 170 includes the insoluble polymer matrix 150 and a plurality of voids 180 having an average effective diameter 190. Although not shown in FIG. 1, it is to be understood that the first solution 110 can be coated on a substrate (not shown), to form a nanovoided coating on the substrate.

Polymerizable material 130 can be any polymerizable material that can be polymerized by various conventional cationic or free radical polymerization techniques, which can be chemical, thermal, or radiation initiated, including, e.g., solvent polymerization, emulsion polymerization, suspension polymerization, bulk polymerization, and radiation polymerization, including, e.g., processes using actinic radiation including, e.g., visible and ultraviolet light, electron beam radiation and combinations thereof.

Actinic radiation curable materials include monomers, oligomers, and polymers of acrylates, methacrylates, urethanes, epoxies and the like. Representative examples of energy curable groups suitable in the practice of the present disclosure include epoxy groups, (meth)acrylate groups, olefinic carbon-carbon double bonds, allyloxy groups, alpha-methyl styrene groups, (meth)acrylamide groups, cyanate ester groups, vinyl ethers groups, combinations of these, and the like. Free radically polymerizable groups are preferred. In some embodiments, exemplary materials include acrylate and methacrylate monomers, and in particular, multifunctional monomers that can form a cross-linked network upon polymerization can be used, as known in the art. The polymerizable materials can include any mixture of monomers, oligomers and polymers; however the materials must be at least partially soluble in at least one solvent. In some embodiments, the materials should be soluble in the solvent monomer mixture.

As used herein, the term "monomer" means a relatively low molecular weight material (i.e., having a molecular weight less than about 500 g/mole) having one or more energy polymerizable groups. "Oligomer" means a relatively intermediate molecular weight material having a molecular weight of from about 500 up to about 10,000 g/mole. "Polymer" means a relatively high molecular weight material having a molecular weight of at least about 10,000 g/mole, preferably at 10,000 to 100,000 g/mole. The term "molecular weight" as used throughout this specification means number average molecular weight unless expressly noted otherwise.

Exemplary monomeric polymerizable materials include styrene, alpha-methylstyrene, substituted styrene, vinyl esters, vinyl ethers, N-vinyl-2-pyrrolidone, (meth)acrylamide, N-substituted (meth)acrylamide, octyl (meth)acrylate, iso-octyl (meth)acrylate, nonylphenol ethoxylate (meth)acrylate, isononyl (meth)acrylate, diethylene glycol (meth)acrylate, isobornyl (meth)acrylate, 2-(2-ethoxyethoxy)ethyl (meth)acrylate, 2-ethylhexyl (meth)acrylate, lauryl (meth)acrylate, butanediol mono(meth)acrylate, beta-carboxyethyl (meth)acrylate, isobutyl (meth)acrylate, cycloaliphatic epoxide, alpha-epoxide, 2-hydroxyethyl (meth)acrylate, (meth)acrylonitrile, maleic anhydride, itaconic acid, isodecyl (meth)acrylate, dodecyl (meth)acrylate, n-butyl (meth)acrylate, methyl (meth)acrylate, hexyl (meth)acrylate, (meth)acrylic acid, N-vinylcaprolactam, stearyl (meth)acrylate, hydroxy functional polycaprolactone ester (meth)acrylate, hydroxyethyl (meth)acrylate, hydroxymethyl (meth)acrylate, hydroxypropyl (meth)acrylate, hydroxyisopropyl (meth)acrylate, hydroxybutyl (meth)acrylate, hydroxyisobutyl (meth)acrylate, tetrahydrofurfuryl (meth)acrylate, combinations of these, and the like.

Oligomers and polymers may also be collectively referred to herein as "higher molecular weight constituents or species." Suitable higher molecular weight constituents may be incorporated into compositions of the present disclosure. Such higher molecular weight constituents may provide benefits including viscosity control, reduced shrinkage upon curing, durability, flexibility, adhesion to porous and non-porous substrates, outdoor weatherability, and/or the like. The amount of oligomers and/or polymers incorporated into fluid compositions of the present disclosure may vary within a wide range depending upon such factors as the intended use of the resultant composition, the nature of the reactive diluent, the nature and weight average molecular weight of the oligomers and/or polymers, and the like. The oligomers and/or polymers themselves may be straight-chained, branched, and/or cyclic. Branched oligomers and/or polymers tend to have lower viscosity than straight-chain counterparts of comparable molecular weight.

Exemplary polymerizable oligomers or polymers include aliphatic polyurethanes, acrylics, polyesters, polyimides, polyamides, epoxy polymers, polystyrene (including copolymers of styrene) and substituted styrenes, silicone containing polymers, fluorinated polymers, combinations of these, and the like. For some applications, polyurethane and acrylic-containing oligomers and/or polymers can have improved durability and weatherability characteristics. Such materials also tend to be readily soluble in reactive diluents formed from radiation curable, (meth)acrylate functional monomers.

Because aromatic constituents of oligomers and/or polymers generally tend to have poor weatherability and/or poor resistance to sunlight, aromatic constituents can be limited to less than 5 weight percent, preferably less than 1 weight percent, and can be substantially excluded from the oligomers and/or polymers and the reactive diluents of the present disclosure. Accordingly, straight-chained, branched and/or cyclic aliphatic and/or heterocyclic ingredients are preferred for forming oligomers and/or polymers to be used in outdoor applications.

Suitable radiation curable oligomers and/or polymers for use in the present disclosure include, but are not limited to, (meth)acrylated urethanes (i.e., urethane (meth)acrylates), (meth)acrylated epoxies (i.e., epoxy (meth)acrylates), (meth)acrylated polyesters (i.e., polyester (meth)acrylates), (meth)acrylated (meth)acrylics, (meth)acrylated silicones, (meth)acrylated polyethers (i.e., polyether (meth)acrylates), vinyl (meth)acrylates, and (meth)acrylated oils.

Solvent 120 can be any solvent that forms a solution with the desired polymerizable material 130. The solvent can be a polar or a non-polar solvent, a high boiling point solvent or a low boiling point solvent, and a mixture of several solvents may be preferred. The solvent or solvent mixture may be selected so that the insoluble polymer matrix 150 formed is at least partially insoluble in the solvent (or at least one of the solvents in a solvent mixture). In some embodiments, the solvent mixture can be a mixture of a solvent and a non-solvent for the polymerizable material. During polymerization, the first solution 110 separates to form the second solution 160 and a polymer-rich solution that polymerizes to form the insoluble polymer matrix 150. In one particular embodiment, the insoluble polymer matrix 150 can be a three-dimensional polymer matrix having polymer chain linkages 155 that provide the three-dimensional framework. The polymer chain linkages 155 can prevent deformation of the insoluble polymer matrix 150 after removal of the solvent 120.

In some embodiments, the second solution 160 can include some remaining polymerizable material 135 that is not incorporated in the insoluble polymer matrix 150, as shown in FIG. 1 (i.e., the second solution 160 has become depleted of polymerizable material 135, but some may still be present). It is preferred to minimize the amount of remaining polymerizable material 135 in the second solution 160, by maximizing the extent of polymerization of composition 140.

In one embodiment, solvent 120 can be easily removed from the composition 140 by drying, for example, at temperatures not exceeding the decomposition temperature of either the insoluble polymer matrix 150, or the substrate (if included). In one particular embodiment, the temperature during drying is kept below a temperature at which the substrate is prone to deformation, e.g., a warping temperature or a glass-transition temperature of the substrate. Exemplary solvents include linear, branched, and cyclic hydrocarbons, alcohols, ketones, and ethers, including for example, propylene glycol ethers such as DOWANOL™ PM propylene glycol methyl ether, isopropyl alcohol, ethanol, toluene, ethyl acetate, 2-butanone, butyl acetate, methyl isobutyl ketone, water, methyl ethyl ketone, cyclohexanone, acetone, aromatic hydrocarbons, isophorone, butyrolactone, N-methylpyrrolidone, tetrahydrofuran, esters such as lactates, acetates, propylene glycol monomethyl ether acetate (PM acetate), diethylene glycol ethyl ether acetate (DE acetate), ethylene glycol butyl ether acetate (EB acetate), dipropylene glycol monomethyl acetate (DPM acetate), iso-alkyl esters, isohexyl acetate, isoheptyl acetate, isooctyl acetate, isononyl acetate, isodecyl acetate, isododecyl acetate, isotridecyl acetate or other iso-alkyl esters; combinations of these and the like.

The first solution 110 can also include other ingredients including, e.g., initiators, curing agents, cure accelerators, catalysts, crosslinking agents, tackifiers, plasticizers, dyes, surfactants, flame retardants, coupling agents, pigments, impact modifiers including thermoplastic or thermoset polymers, flow control agents, foaming agents, fillers, glass and polymer microspheres and microparticles, other particles including electrically conductive particles, thermally conductive particles, fibers, antistatic agents, antioxidants, UV absorbers, and the like.

An initiator, such as a photoinitiator, can be used in an amount effective to facilitate polymerization of the monomers present in the first solution 110. The amount of photoinitiator can vary depending upon, for example, the type of initiator, the molecular weight of the initiator, the intended application of the resulting insoluble polymer matrix 150 and the polymerization process including, e.g., the temperature of the process and the wavelength of the actinic radiation used. Useful photoinitiators include, for example, those available from Ciba Specialty Chemicals under the IRGACURE™ and DAROCURE™ trade designations, including IRGACURE™ 184 and IRGACURE™ 819.

In some embodiments, a mixture of initiators and initiator types can be used, for example to control the polymerization in different sections of the process. In one embodiment, optional post-processing polymerization may be a thermally initiated polymerization that requires a thermally generated free-radical initiator. In other embodiments, optional post-processing polymerization may be an actinic radiation initiated polymerization that requires a photoinitiator. The post-processing photoinitiator may be the same or different than the photoinitiator used to polymerize the polymer matrix in solution.

The insoluble polymer matrix 150 may be cross-linked to provide a more rigid polymer network. Cross-linking can be achieved with or without a cross-linking agent by using high energy radiation such as gamma or electron beam radiation. In some embodiments, a cross-linking agent or a combination of cross-linking agents can be added to the mixture of polymerizable monomers. The cross-linking can occur during polymerization of the polymer network using any of the actinic radiation sources described elsewhere.

Useful radiation curing cross-linking agents include multifunctional acrylates and methacrylates, such as those disclosed in U.S. Pat. No. 4,379,201 (Heilmann et al.), which include 1,6-hexanediol di(meth)acrylate, trimethylolpropane tri(meth)acrylate, 1,2-ethylene glycol di(meth)acrylate, pentaerythritol tri/tetra(meth)acrylate, triethylene glycol di(meth)acrylate, ethoxylated trimethylolpropane tri(meth)acrylate, glycerol tri(meth)acrylate, neopentyl glycol di(meth)acrylate, tetraethylene glycol di(meth)acrylate, 1,12-dodecanol di(meth)acrylate, copolymerizable aromatic ketone co-monomers such as those disclosed in U.S. Pat. No. 4,737,559 (Kellen et al.) and the like, and combinations thereof.

The first solution 110 may also include a chain transfer agent. The chain transfer agent is preferably soluble in the monomer mixture prior to polymerization. Examples of suitable chain transfer agents include triethyl silane and mercaptans. In some embodiments, chain transfer can also occur to the solvent; however this may not be a preferred mechanism.

The polymerizing step preferably includes using a radiation source in an atmosphere that has a low oxygen concentration. Oxygen is known to quench free-radical polymerization, resulting in diminished extent of cure. The radiation source used for achieving polymerization and/or crosslinking may be actinic (e.g., radiation having a wavelength in the ultraviolet or visible region of the spectrum), accelerated particles (e.g., electron beam radiation), thermal (e.g., heat or infrared radiation), or the like. In some embodiments, the energy is actinic radiation or accelerated particles, because such energy provides excellent control over the initiation and rate of polymerization and/or crosslinking Additionally, actinic radiation and accelerated particles can be used for curing at relatively low temperatures. This avoids degrading or evaporating components that might be sensitive to the relatively high temperatures that might be required to initiate polymerization and/or crosslinking of the energy curable groups when using thermal curing techniques. Suitable sources of curing energy include UV LEDs, visible LEDs, lasers, electron beams, mercury lamps, xenon lamps, carbon arc lamps, tungsten filament lamps, flashlamps, sunlight, low intensity ultraviolet light (black light), and the like.

A major portion of the solvent 120 is removed in the solvent removal step to produce the nanovoided article 170. By a major portion of the solvent is meant greater than 90%, 80%, 70%, 60%, or greater than 50% by weight of the solvent. Solvent can be removed by drying in a thermal oven that can include air floatation/convection, drying with infrared or other radiant light sources, vacuum drying, gap drying, or a combination of drying techniques. The choice of drying technique can be governed by the desired process speed, extent of solvent removal, and expected coating morphology, among others. In one particular embodiment, gap drying can offer advantages for solvent removal, as gap drying offers rapid drying within minimal space.

Figure 2:
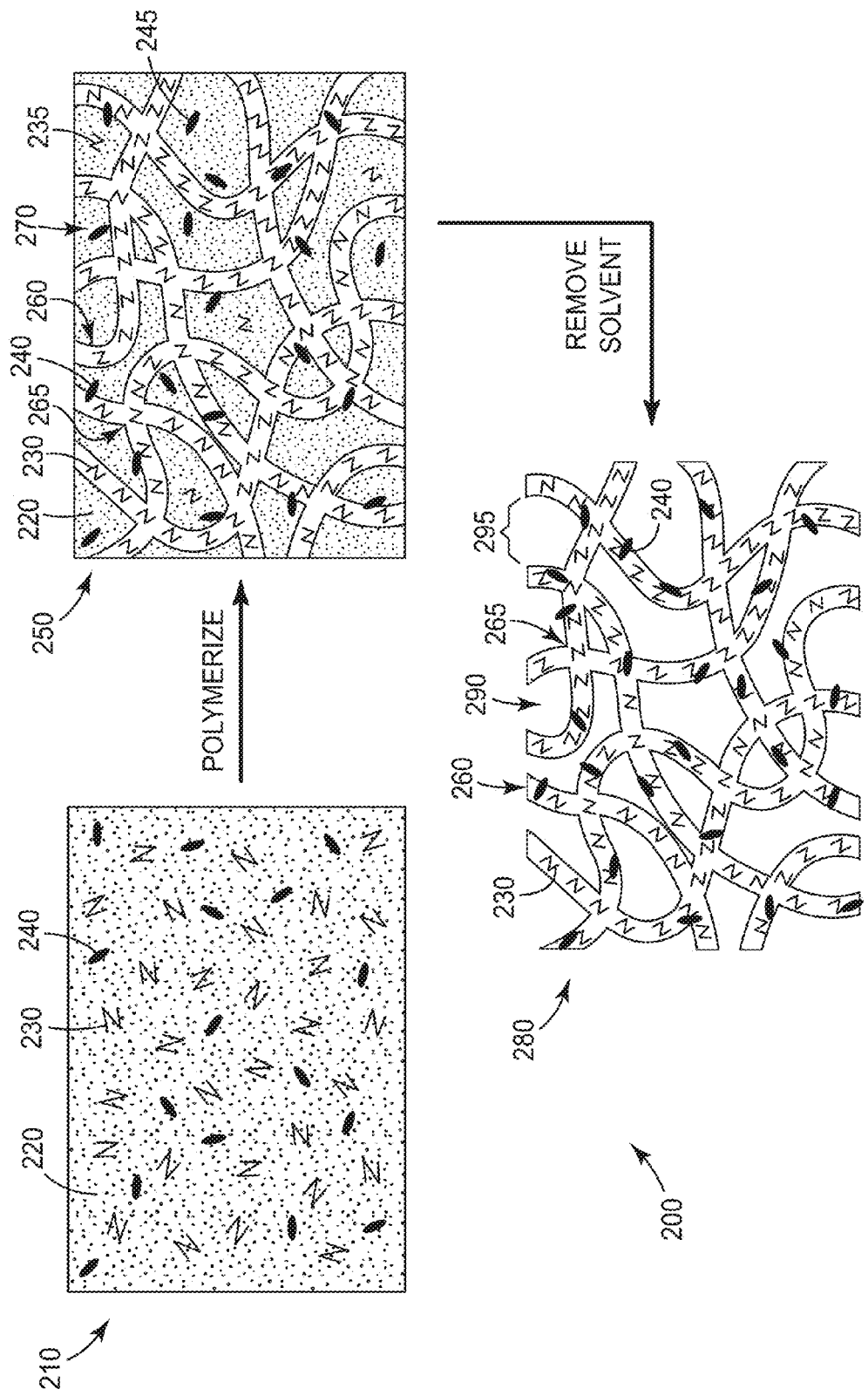
FIG. 2 is a schematic view of a process for forming a nanovoided article.

FIG. 2 shows a schematic view of a process 200 for forming a nanovoided article 280 according to another aspect of the disclosure. A first solution 210 that includes a polymerizable material 230 and nanoparticles 240 in a solvent 220 is provided. The first solution 210 is at least partially polymerized to form a composition 250 including the nanoparticles 240 bound to an insoluble polymer matrix 260 in a second solution 270. A major portion of the solvent 220 is removed from the second solution 270 to form the nanovoided article 280. In one particular embodiment, the insoluble polymer matrix 260 can be a three-dimensional polymer matrix having polymer chain linkages 265 that provide the three-dimensional framework. The polymer chain linkages 265 can prevent deformation of the insoluble polymer matrix 260 after removal of the solvent 220.

In some embodiments, the second solution 270 can include some remaining polymerizable material 235 that is not incorporated in the insoluble polymer matrix 260, as shown in FIG. 2 (i.e., the second solution 270 has become depleted of polymerizable material 235, but some may still be present). It is preferred to minimize the amount of remaining polymerizable material 235 in the second solution 270, after the polymerizing step. In some embodiments, the second solution 270 can also include a minor portion of nanoparticles 245 that are not bound to the insoluble polymer matrix 260, as shown in FIG. 2 (i.e., the second solution 270 has become depleted of nanoparticles 240, but some may still be present). It is generally desired to minimize the quantity of nanoparticles 245 that are not bound to the insoluble polymer matrix 260 after the polymerizing step. As used herein, nanoparticles "bound to" the polymer matrix is meant to include nanoparticles completely embedded in the polymer matrix, nanoparticles partially embedded in the polymer matrix, nanoparticles attached to the surface of the polymer matrix, or a combination thereof.

In one particular embodiment, nanoparticles 240 can be surface modified reactive nanoparticles that are chemically bound to the insoluble polymer matrix 260. In one particular embodiment, nanoparticles 240 can be surface modified non-reactive nanoparticles that are physically bound to the insoluble polymer matrix 260. In one particular embodiment, nanoparticles 240 can be a mixture of surface modified reactive and non-reactive nanoparticles.

Nanovoided article 280 includes the nanoparticles 240 bound to the insoluble polymer matrix 260, and a plurality of voids 290 having an average effective diameter 295. Although not shown in FIG. 2, it is to be understood that the first solution 210 can be coated on a substrate to form a nanovoided coating on the substrate.

The polymerizable material 230 and solvent 220 can be the same as described for polymerizable material 130 and solvent 120, respectively, of FIG. 1. In one embodiment, the nanoparticles 240 can be inorganic nanoparticles, organic (e.g., polymeric) nanoparticles, or a combination of organic and inorganic nanoparticles. In one particular embodiment, particles 240 can be porous particles, hollow particles, solid particles, or a combination thereof. Examples of suitable inorganic nanoparticles include silica and metal oxide nanoparticles including zirconia, titania, ceria, alumina, iron oxide, vanadia, antimony oxide, tin oxide, alumina/silica, and combinations thereof. The nanoparticles can have an average particle diameter less than about 1000 nm, less than about 100 nm, less than about 50 nm, or from about 3 nm to about 50 nm. In some embodiments, the nanoparticles can have an average particle diameter from about 3 nm to about 50 nm, or from about 3 nm to about 35 nm, or from about 5 to about 25 nm. If the nanoparticles are aggregated, the maximum cross sectional dimension of the aggregated particle can be within any of these ranges, and can also be greater than about 100 nm. In some embodiments, "fumed" nanoparticles, such as silica and alumina, with primary size less than about 50 nm, are also included, such as CAB-O-SPERSE® PG 002 fumed silica, CAB-O-SPERSE® 2017A fumed silica, and CAB-O-SPERSE® PG 003 fumed alumina, available from Cabot Co. Boston, Mass.

In some embodiments, the nanoparticles 240 include surface groups selected from the group consisting of hydrophobic groups, hydrophilic groups, and combinations thereof. In other embodiments, the nanoparticles include surface groups derived from an agent selected from the group consisting of a silane, organic acid, organic base, and combinations thereof. In other embodiments, the nanoparticles include organosilyl surface groups derived from an agent selected from the group consisting of alkylsilane, arylsilane, alkoxysilane, and combinations thereof.

The term "surface-modified nanoparticle" refers to a particle that includes surface groups attached to the surface of the particle. The surface groups modify the character of the particle. The terms "particle diameter" and "particle size" refer to the maximum cross-sectional dimension of a particle. If the particle is present in the form of an aggregate, the terms "particle diameter" and "particle size" refer to the maximum cross-sectional dimension of the aggregate. In some embodiments, particles can be large aspect ratio aggregates of nanoparticles, such as fumed silica particles.

The surface-modified nanoparticles have surface groups that modify the solubility characteristics of the nanoparticles. The surface groups are generally selected to render the particle compatible with the first solution 210. In one embodiment, the surface groups can be selected to associate or react with at least one component of the first solution 210, to become a chemically bound part of the polymerized network.

A variety of methods are available for modifying the surface of nanoparticles including, e.g., adding a surface modifying agent to nanoparticles (e.g., in the form of a powder or a colloidal dispersion) and allowing the surface modifying agent to react with the nanoparticles. Other useful surface modification processes are described in, e.g., U.S. Pat. No. 2,801,185 (Iler) and U.S. Pat. No. 4,522,958 (Das et al.), and incorporated herein.

Useful surface-modified silica nanoparticles include silica nanoparticles surface-modified with silane surface modifying agents including, e.g., Silquest® silanes such as Silquest® A-1230 from GE Silicones, 3-acryloyloxypropyl trimethoxysilane, 3-methacryloyloxypropyltrimethoxysilane, 3-mercaptopropyltrimethoxysilane, n-octyltrimethoxysilane, isooctyltrimethoxysilane, 4-(triethoxysilyl)-butyronitrile, (2-cyanoethyl)triethoxysilane, N-(3-triethoxysilylpropyl)methoxyethoxyethoxyethyl carbamate (PEG3TMS), N-(3-triethoxysilylpropyl)methoxyethoxyethoxyethyl carbamate (PEG2TMS), 3-(methacryloyloxy)propyltriethoxysilane, 3-(methacryloyloxy)propylmethyldimethoxysilane, 3-(acryloyloxypropyl) methyldimethoxysilane, 3-(methacryloyloxy) propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, and combinations thereof. Silica nanoparticles can be treated with a number of surface modifying agents including, e.g., alcohol, organosilane including, e.g., alkyltrichlorosilanes, trialkoxyarylsilanes, trialkoxy(alkyl)silanes, and combinations thereof and organotitanates and mixtures thereof.

The nanoparticles may be provided in the form of a colloidal dispersion. Examples of useful commercially available unmodified silica starting materials include nano-sized colloidal silicas available under the product designations NALCO 1040, 1050, 1060, 2326, 2327, and 2329 colloidal silica from Nalco Chemical Co., Naperville, Ill.; the organosilica under the product name IPA-ST-MS, IPA-ST-L, IPA-ST, IPA-ST-UP, MA-ST-M, and MA-ST sols from Nissan Chemical America Co. Houston, Tex. and the SnowTex® ST-40, ST-50, ST-20L, ST-C, ST-N, ST-O, ST-OL, ST-ZL, ST-UP, and ST-OUP, also from Nissan Chemical America Co. Houston, Tex. The weight ratio of polymerizable material to nanoparticles can range from about 30:70, 40:60, 50:50, 55:45, 60:40, 70:30, 80:20 or 90:10 or more. The preferred ranges of wt % of nanoparticles range from about 10% by weight to about 60% by weight, and can depend on the density and size of the nanoparticle used.

Figure 3A:
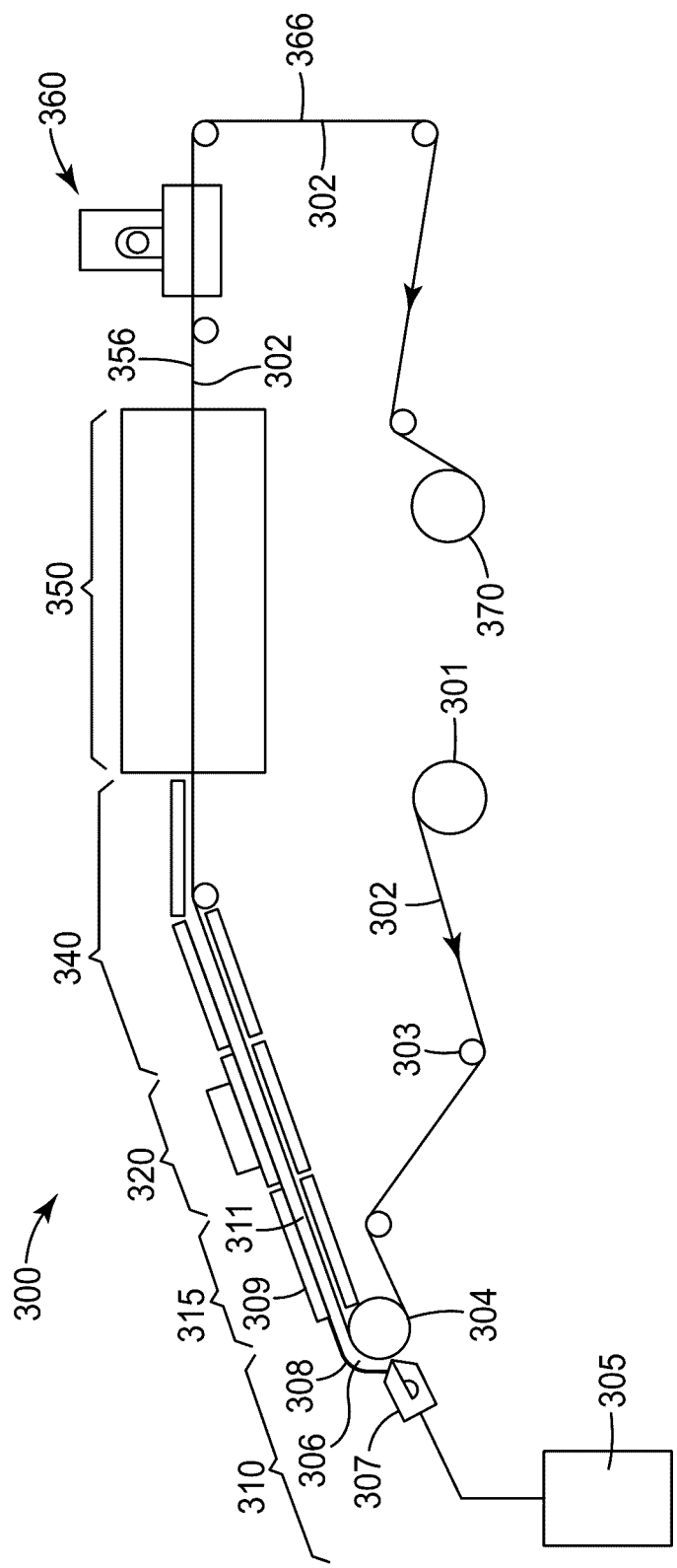
FIG. 3A is a schematic view of a process for forming a nanovoided coating.

FIG. 3A shows a schematic view of a process 300 for forming a nanovoided coating 356 on a substrate 302, according to one aspect of the disclosure. The process 300 shown in FIG. 3A is a continuous process, although it is to be understood that the process can instead be performed in a stepwise manner, i.e., the steps of coating, polymerizing, and removing solvent described below can be performed on individual substrate pieces in discrete operations, to form the nanovoided coating.

The process 300 shown in FIG. 3A passes a substrate 302 through a coating section 310, an optional coating conditioning section 315, a polymerization section 320, a first solvent removal section 340, and an optional second solvent removal section 350 to form the nanovoided coating 356 on the substrate 302. Nanovoided coating 356 on substrate 302 then passes through optional second polymerization section 360 to form an optionally post-cured nanovoided coating 366 on the substrate 302, which is then wound up as an output roll 370. In some embodiments, process 300 can include additional processing equipment common to the production of web-based materials, including, for example, idler rolls; tensioning rolls; steering mechanisms; surface treaters such as corona or flame treaters; lamination rolls; and the like. In some embodiments, the process 300 can utilized different web paths, coating techniques, polymerization apparatus, positioning of polymerization apparatus, drying ovens, conditioning sections, and the like, and some of the sections described can be optional.

The substrate 302 can be any known substrate suitable for roll-to-roll web processing in a webline, including, for example, polymeric substrates, metalized polymeric substrates, metal foils, combinations thereof, and the like. In one particular embodiment, the substrate 302 is an optical quality polymeric substrate, suitable for use in an optical display such as a liquid crystal display.

The substrate 302 is unwound from an input roll 301, passes over idler rolls 303 and contacts coating roll 304 in coating section 310. A first solution 305 passes through a coating die 307 to form a first coating 306 of first solution 305 on substrate 302. The first solution 305 can include solvents, polymerizable materials, optional nanoparticles, photoinitiators, and any of the other first solution components described elsewhere. A shroud 308 positioned between the coating die 307 in the coating section 310, and a coating conditioning region 309 in the optional coating conditioning section 315, can provide a first controlled environment 311 surrounding the first solution 305. In some embodiments, the shroud 308 and optional coating conditioning section 315 can be optional, for example, when the polymerization occurs before substantial change can occur in the composition of the first solution 305. The substrate 302 having the first coating 306 of first solution 305 then enters the polymerization section 320 where the first solution 305 is polymerized, as described elsewhere.

The coating die 307 can include any known coating die and coating technique, and is not to be limited to any specific die design or technique of coating thin films. Examples of coating techniques include knife coating, gravure coating, slide coating, slot coating, slot-fed knife coating, curtain coating, and the like as known to those skilled in the art. Several applications of the nanovoided article can include the need for precise thickness and defect-free coatings, and may require the use of a precise slot coating die 307 positioned against a precision coating roll 304 as shown in FIG. 3A. The first coating 306 can be applied at any thickness; however thin coatings are preferred, for example coatings less than 1000 microns thick, less than about 500 microns thick, or even less than about 100 microns thick can provide nanovoided articles having exemplary properties.

Because the first coating 306 includes at least one solvent and a polymerizable material as described elsewhere, the shroud 308 is positioned to reduce any undesired loss of solvent from the coating, and also to protect the coating from oxygen which can inhibit the polymerization. The shroud 308 can be, for example, a formed aluminum sheet that is positioned in close proximity to the first coating 306 and provides a seal around the coating die 307 and the coating roll 304 so that the first controlled environment 311 can be maintained. In some embodiments, the shroud 308 can also serve to protect the coating from ambient room conditions. The first controlled environment 311 can include inerting gases such as nitrogen to control oxygen content, solvent vapors to reduce the loss of solvent, or a combination of inert gases and solvent vapors. The oxygen concentration can affect both the rate and extent of polymerization, so in one embodiment, the oxygen concentration in the first controlled environment 311 is reduced to less than 1000 parts-per-million (ppm), less than 500 ppm, less than 300 ppm, less than 150 ppm, less than 100 ppm, or even less than 50 ppm. Generally, the lowest oxygen concentration that can be attained is preferred.

The coating conditioning region 309 in the optional coating conditioning section 315 is an extension of the shroud 308 that provides additional capabilities to modify the first coating 306 before entering the polymerization section 320. The first controlled environment 311 can still be maintained within coating conditioning region 309. In other embodiments, additional heating, cooling, or input and exhaust gases can be provided to adjust or maintain the composition of the first coating 306. For example, solvent vapor can be introduced in the input gas to reduce evaporation of solvent from the first coating 306 prior to polymerization.

A heating apparatus, such as a gap dryer described, for example, in U.S. Pat. No. 5,694,701 can be used to raise or lower the temperature of first coating 306, drive off additional solvent to adjust the composition of first coating 306, or both. The gap dryer could also be used to remove a portion of the solvent before the polymerization section to enable the desired thin film morphology, for example when the optimum composition of the coating (e.g., % solids) is different from the optimum composition for polymerization. Often, coating conditioning region 309 can serve to provide additional time for the first coating 306 to stabilize, for example, to smooth any surface ripples or streaks, prior to polymerization.

Figure 3B:
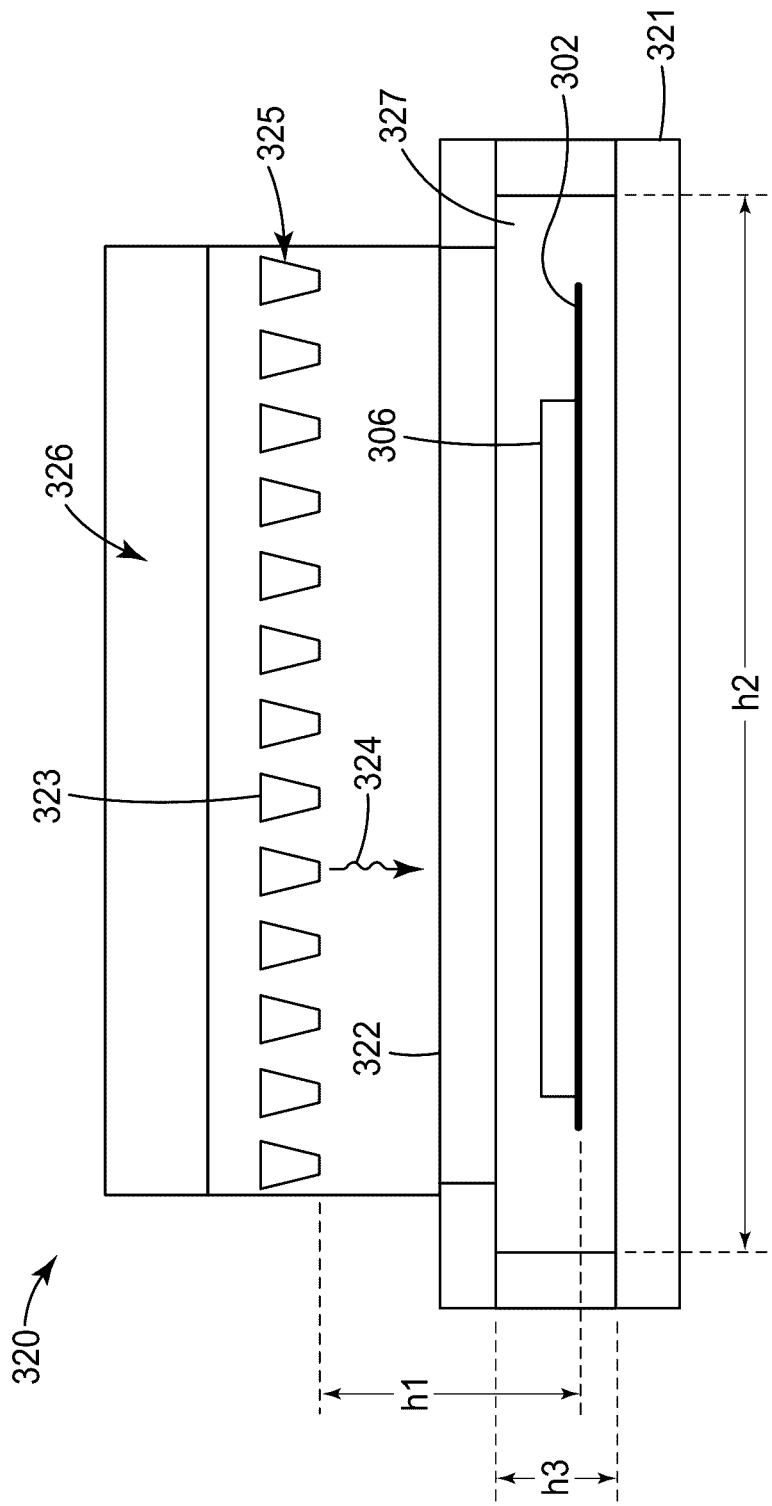
FIG. 3B is a schematic view of a polymerization section of FIG. 3A.

FIG. 3B is a schematic view of the polymerization section 320 of process 300 shown in FIG. 3A, according to one aspect of the disclosure. FIG. 3B shows a cross-section of the polymerization section 320 as viewed down the path of the substrate 302. Polymerization section 320 includes a housing 321 and a quartz plate 322 that provide boundaries of a second controlled environment 327 that partially surrounds the first coating 306 on substrate 302. A radiation source 323 generates actinic radiation 324 that passes through quartz plate 322 and polymerizes the first coating 306 on substrate 302. Instead of a single radiation source 323, a radiation source array 325 shown in FIG. 3B can provide improved uniformity and rate of polymerization to the polymerization process. The radiation source array 325 can provide individual control of radiation source 323, for example, crossweb or downweb profiles can be generated as desired. A heat extractor 326 can be positioned to control the temperature by removing heat generated by each radiation source 323 in the radiation source array 325.

The housing 321 can be a simple enclosure designed to surround the substrate 302, first coating 306, and an at least partially polymerized second coating 336 (shown in FIG. 3C), or the housing 321 can also include additional elements, such as, for example, temperature controlled plates (not shown) that can adjust the temperature of a second controlled environment 327. The housing 321 has sufficient interior dimensions "h3" and "h2" to enclose substrate 302 and first coating 306 to provide the second controlled environment 327. The gas flow fields impact inerting capabilities, coating composition, coating uniformity and the like. As shown in FIG. 3B, the housing 321 includes a top quartz plate 322 separating the second controlled environment 327 from radiation source 323 in radiation source array 325. The radiation source array 325 is positioned a distance "h1" from the substrate 302 to provide uniform actinic radiation 324 to the first coating 306. In one embodiment, "h1" and "h3" are 1 inch (2.54 cm) and 0.25 inch (0.64 cm), respectively. In some embodiments (not shown), the polymerization section 320 can be inverted so that the quartz plate 322 and radiation source 323 are located beneath the substrate 302, and actinic radiation 324 passes through the substrate 302 before polymerizing first coating 306. In other embodiments (also not shown), the polymerization section 320 can include two quartz plates 322 and two radiation sources 323, located above and below the substrate, to polymerize first coating 306.

The radiation source 323 can be any source of actinic radiation as described elsewhere. In some embodiments, radiation source 323 is an ultraviolet LED that is capable of producing UV radiation. A combination of radiation sources emitting at different wavelengths can be used to control the rate and extent of the polymerization reaction. The UV-LEDs or other radiation sources can generate heat during operation, and the heat extractor 326 can be fabricated from aluminum that is cooled by either air or water to control the temperature by removing the generated heat.

Figure 3C:
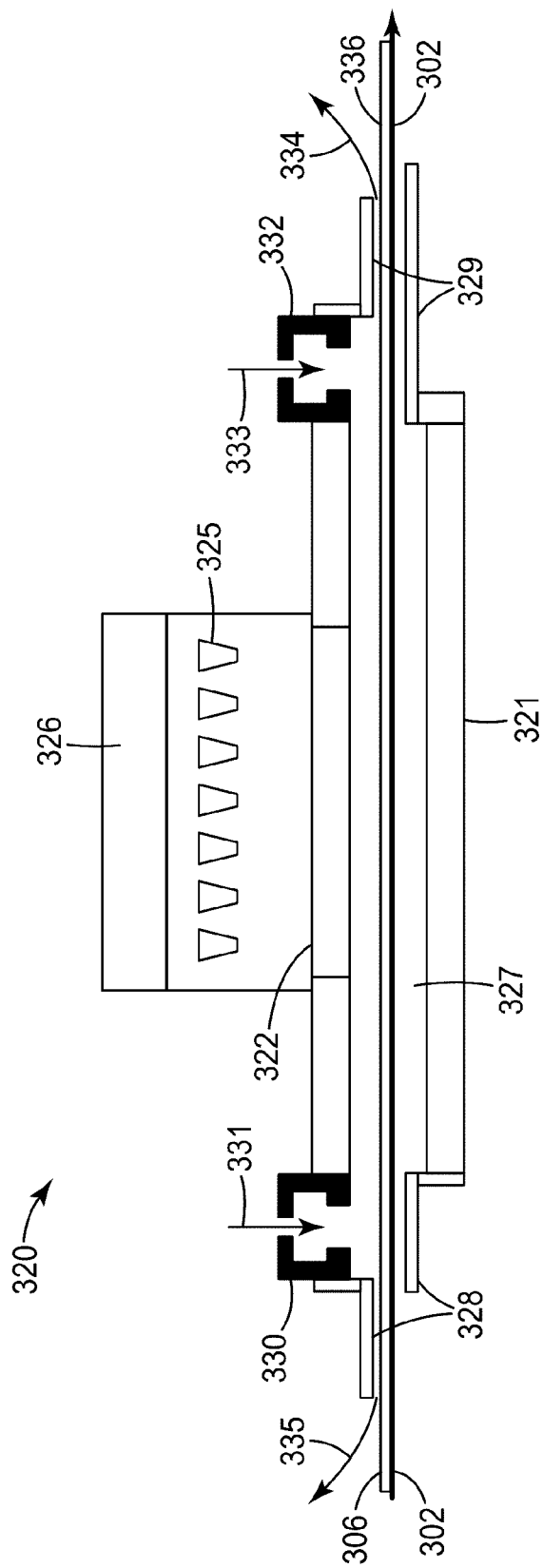
FIG. 3C is schematic view of the polymerization section of FIG. 3B.

FIG. 3C is a schematic view of the polymerization section 320 of process 300 shown in FIG. 3A, according to one aspect of the disclosure. FIG. 3C shows a cross-section of the polymerization section 320 as viewed along an edge of the substrate 302. Polymerization section 320 includes the housing 321 and the quartz plate 322 that provide boundaries of the second controlled environment 327. The second controlled environment 327 partially surrounds the first coating 306 and the at least partially polymerized second coating 336 on substrate 302. At least partially polymerized second coating 336 includes an insoluble polymer matrix in a second solution, as described elsewhere.

The second controlled environment 327 will now be described. Housing 321 includes an entrance aperture 328 and an exit aperture 329 that can be adjusted to provide any desired gap between the substrate 302, the coating 306 on substrate 302, and the respective aperture. The second controlled environment 327 can be maintained by control of the temperature of the housing 321, and appropriate control of the temperature, composition, pressure and flow rate of a first input gas 331, a second input gas 333, a first output gas 335 and a second output gas 334. Appropriate adjustment of the sizes of the entrance and exit apertures 328, 329 can aid control of the pressure and flow rate of the first and second output gases 335, 334, respectively.

The first output gas 335 can flow from the second controlled environment 327 through the entrance aperture 328 and into the first controlled environment 311 of optional coating conditioning section 315, shown in FIG. 3A. In some embodiments, the pressure within the second controlled environment 327 and the first controlled environment 311 are adjusted to prevent flow between the two environments, and first output gas 335 can exit second controlled environment 327 from another location (not shown) within housing 321. The second output gas 334 can flow from the second controlled environment 327 through the exit aperture 329, and into the first solvent removal section 340 shown in FIG. 3A, or the second output gas 334 can exit second controlled environment 327 from another location (not shown) within housing 321.

A first input gas manifold 330 is positioned adjacent the housing 321 proximate the entrance aperture 328, to distribute the first input gas 331 with desired uniformity across the width of the first coating 306. A second input gas manifold 332 is positioned adjacent the housing 321 proximate the exit aperture 329, to distribute the second input gas 333 with desired uniformity across the width of the second coating 336. First and second input gases 331, 333 can be distributed above the web, below the web, or in any combination of above and below the web, as desired. First and second input gases 331, 333 can be the same or they can be different, and can include inerting gasses such as nitrogen, which can reduce oxygen concentration that can inhibit the polymerization reaction, as is known. First and second input gases 331, 333 can also include solvent vapors that can help reduce the loss of solvent from first coating 306 before or during polymerization, as described elsewhere. The relative flow rates, flow velocities, flow impingement or orientation on the coating, and temperature of each of the first and second input gases 331, 333 can be controlled independently, and can be adjusted to reduce imperfections in the first coating 306 prior to polymerization. The imperfections can be caused by disturbances to the coating, as known in the art. In some cases, only one of the first and second input gases 331, 333 may be flowing.

Returning now to FIG. 3A, the remainder of the process will be described. After leaving polymerization section 320, second polymerized coating 336 on substrate 302 enters first solvent removal section 340. First solvent removal section 340 can be a conventional drying oven that removes solvent by heating the second polymerized coating 336 to evaporate the solvent. A preferred first solvent removal section 340 is a gap dryer, such as described, for example, in U.S. Pat. Nos. 5,694,701 and 7,032,324. A gap dryer can provide greater control of the drying environment, which may be desired in some applications. An optional second solvent removal section 350 can further be used to ensure that a major portion of the solvent is removed.

A nanovoided coating 356 on substrate 302 exits optional second solvent removal section 350 and then passes through optional second polymerization section 360 to form an optionally post-cured nanovoided coating 366 on the substrate 302. Optional second polymerization section 360 can include any of the actinic radiation sources previously described, and can increase the extent of cure of the nanovoided coating 356. In some embodiments, increasing the extent of cure can include polymerizing remaining polymerizable material (i.e., remaining polymerizable material 135, 235, shown in FIG. 1 and FIG. 2, respectively) after removal of the solvent. Nanovoided coating 356 on substrate 302 exits optional second polymerization section 360 and is then wound up as an output roll 370. In some embodiments, output roll 370 can have other desired films (not shown) laminated to the nanovoided coating and simultaneously wound on the output roll 370. In other embodiments, additional layers (not shown) can be coated, cured, and dried on either the nanovoided coating 356 or the substrate 302.

EXAMPLES

The following list of materials and their source is referred to throughout the Examples.

| | |
|---|---|
| Nalco 2327 - colloidal silica dispersion | Nalco Co. Naperville IL |
| 3-(Methacryloyloxy)propyltrimethoxy silane | Aldrich Chemical, Milwaukee WI |
| Silquest ® A-174 silane | GE Advanced Materials, Wilton CT |
| 1-methoxy-2-propanol - solvent | Aldrich Chemical, Milwaukee WI |
| Prostabb 5128 - hindered amine nitroxide inhibitor | Ciba Specialties Chemical, Tarrytown NY |
| SR444 Pentaerythritol triacrylate | Sartomer Company, Exton PA |
| SR238 Hexanedioldiacrylate | Sartomer Company, Exton PA |
| SR506 Isobornyl Acrylate | Sartomer Company, Exton PA |
| Irgacure 184 - photoinitiator | Ciba Specialties Chemical, Tarrytown NY |
| Irgacure 819 - photoinitiator | Ciba Specialties Chemical, Tarrytown NY |
| Tinuvin 292 - hindered amine light stabilizer | Ciba Specialties Chemical, Tarrytown NY |
| ethyl acetate - solvent | Aldrich Chemical, Milwaukee WI |
| IPA - isopropyl alcohol (solvent) | Aldrich Chemical, Milwaukee WI |
| DOWANOL ™ PM glycol ether - solvent | Dow Chemical, Midland MI |

Example 1

Nanoporous Article Formed by Polymerization in Solution

A first coating solution including surface modified nanoparticles was prepared. The surface modified nanoparticles were reactive nanoparticles that would chemically bond with the polymer during polymerization.

Preparation of Reactive Nanoparticles:

400 g of a Nalco 2327 colloidal silica dispersion was charged to a 1 quart jar. In a separate container, 450 g of 1-methoxy-2-propanol, 25.43 g of 3-(Methacryloyloxy)propyltrimethoxy silane and 0.27 g of Prostab 5128 (1% by weight in water) were mixed together and added to the colloidal silica dispersion while stirring. The jar was sealed and heated to 80° C. for 17 hours, resulting in a solution of reactive surface modified nanoparticles.

Preparation of Radiation Curable Hard Coat (RCHC) Coating Solution:

Three acrylate monomers, SR444 (400 g), SR238 (400 g) and SR506 (200 g) were combined and mixed to form a radiation curable resin. In a separate flask, 667 g of the solution of reactive nanoparticles (above) was mixed with 174 g of the radiation curable resin, and 1.22 g of Prostab 5128 (5% by weight in water). The water and 1-methoxy-2-propanol were removed from the mixture via rotary evaporation. This yielded a clear composition (approximately 308 g) having a weight percent of modified silica of about 43%. A first coating solution was prepared by diluting the clear composition to 40% solids using ethyl acetate, and adding Irgacure 819 photoinitiator at 2% by weight of solids.

Processing Coating Solution:

The general process followed the schematic presented in FIGS. 3A-C. The first coating solution was supplied at a rate of 3 cc/min to a 4 inch (10.2 cm) wide slot-type coating die. The substrate was moving at a speed of 10 ft/min (305 cm/min), resulting in a wet coating thickness of approximately 8 microns. The 4 inch wide coating die was inside a clamshell enclosure (i.e., shroud) and the clamshell was supplied with nitrogen at a flow rate of 180 cubic feet/hour (84 liters/min). The clamshell was directly coupled to a small gap web enclosure provided with two quartz windows. The nitrogen flow to the clamshell provided for inerting of the small gap polymerization section to a level of 360 ppm oxygen.

The polymerization section included two Clearstone Tech UV LED units having 18 LEDs positioned within a 1.75 inch (4.4 cm) diameter circle, available from Clearstone Technologies Inc., Minneapolis Minn. The two UV LED units were positioned directly over the quartz windows and when turned ON, operated at 100% power. The wavelengths of each UV LED unit were 405 nm and 365 nm, respectively. The 365 nm UV LED produced approximately 0.11 W/cm$^2$ UV-A, and 0 W/cm$^2$ visible radiation, and the 405 nm UV LED produced approximately 0.03 W/cm$^2$ UV-A, and 0.196 W/cm$^2$ visible radiation. The LEDs were powered by a CF 1000 UV-Vis LED Source, also available from Clearstone. Two samples were prepared, one with the UV LEDs turned on, and one with the UV LEDs turned off.

Figure 4A:
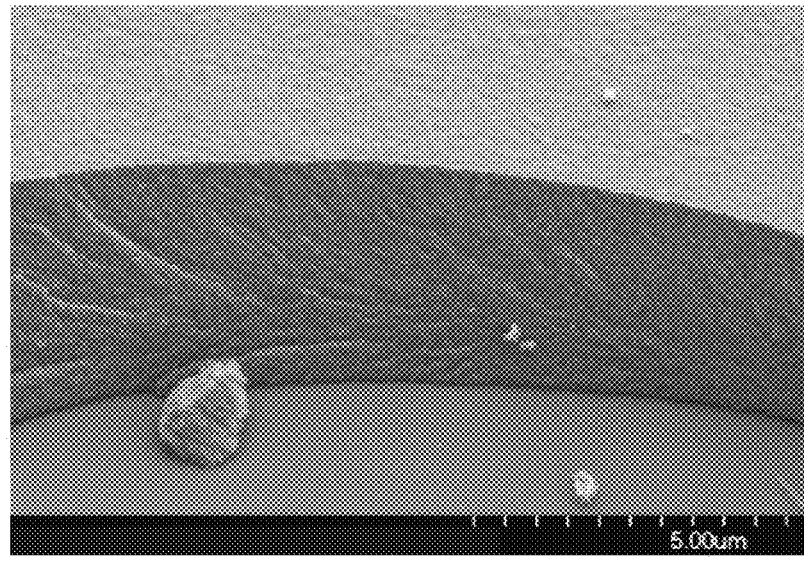
FIG. 4A is a scanning electron micrograph image of a coating.

Following UV LED polymerization, the coated web traveled a 10 ft (3 m) span in the room environment, and then passed through two 5 ft (1.5 m) long zones of small gap drying with plate temperatures set at 170° F. (77° C.). The coating was then post-polymerized using a Fusion Systems Model 1300P (Gaithersburg Md.) fitted with an H-bulb. The UV chamber was nitrogen-inerted to approximately 50 ppm oxygen. FIG. 4A shows an SEM of the sample prepared with the UV LEDs turned off, and FIG. 4B shows an SEM of the sample prepared with the UV LEDs turned on.

Figure 4B:
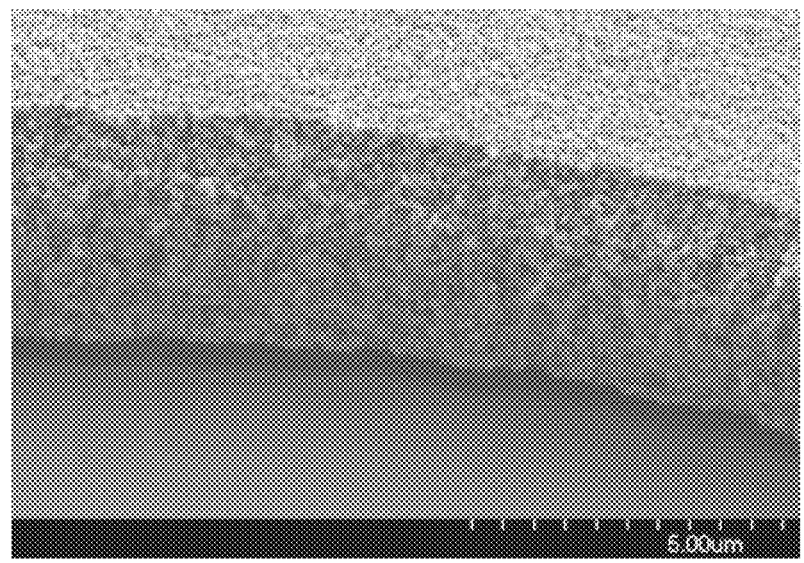
FIG. 4B is a scanning electron micrograph image of a nanovoided coating.

Comparison of FIGS. 4A and 4B shows the ability of UV LED polymerization to change the thin film morphology. FIG. 4A shows that without polymerization while in solution, the coating is non-porous. FIG. 4B shows that with polymerization while in solution, a nanovoided coating with pore dimensions in the nanometer size range, results.

The refractive index of each of the samples was measured at 632.8 nm using a Metricon MODEL 2010 prism coupler (Metricon Corporation Inc., Pennington, N.J.). The surface roughness of the samples was measured using Digital Instruments Dimension 5000 SPM AFM System. The volume fraction of air was estimated using the volume average relationship between refractive index and volume fraction; $V_1 n_1 + V_2 n_2 = n_f$ and $V_1 + V_2 = 1$. Here $V_1$ is the volume fraction of air, $n_1$ is the refractive index of air, $V_2$ is the volume fraction of resin/particle, $n_2$ is the refractive index of the resin/particle, and $n_f$ is the refractive index of the resulting coating. Measuring the refractive index of the resulting coating and knowing the refractive index of air and resin/particle system, the equations can be used to estimate the volume fraction of air in the film. The results are summarized in Table 1 below.

TABLE 1

| UV LED | Refractive Index | Calculated Volume Fraction of Air | RMS Surface Roughness (nm) |
|---|---|---|---|
| Off | 1.49 | 0 | 3.33 |
| On | 1.37 | 0.23 | 15.9 |

Example 2

Control of Nanoporosity and Refractive Index

A solution of a radiation curable material having silica nanoparticles (906 Hardcoat solution) was used to generate thin films polymerized using a range of UV LED power levels. A 906 Hardcoat stock solution made by the process described in column 10, line 25-39 and example 1 of U.S. Pat. No. 5,677,050 to Bilkadi et al., is a composition that includes: 18.4 wt % 20 nm silica (Nalco 2327) surface modified with methacryloyloxypropyltrimethoxysilane (acrylate silane), 25.5 wt % pentaerthritol tri/tetra acrylate (PETA), 4.0 wt % N,N-dimethylacrylamide (DMA), 1.2 wt % Irgacure 184, 1.0 wt % Tinuvin 292, 46.9 wt % isopropanol, and 3.0 wt % water. The stock solution of 906 Hardcoat was diluted to 35% solids with 1-methoxy 2-propanol to form a first coating solution. The first coating solution was applied to a 0.002 inch (0.051 mm) thick primed polyester (Melinex 617, DuPont Teijin Films) substrate web, in the process shown in FIGS. 3A-3C.

The first coating solution was supplied at a rate of 3 cc/min to a 4 inch (10.2 cm) wide slot type coating die, onto a substrate moving at a speed of 5 ft/min (152 cm/min), resulting in a wet coating thickness of approximately 19 microns. After coating, the web passed through a shroud to reduce evaporation of the solvent before entering the UV LED polymerization section. The UV LED radiation source array had 8 LEDs across the width of the web and 20 rows of LEDs down the length of the web in a 4 inch (10.2 cm) by 8 inch (20.4 cm) area. The LEDs were 385 nm UV LEDs (available from Cree Inc., Durham N.C.). The UV LED array was spaced approximately 1 inch (2.54 cm) from the substrate with the 4" (10.2 cm) dimension positioned in the downweb direction. The fan-cooled array is powered by a TENMA 72-6910 (42V/10 A) power supply (available from TENMA, Centerville Ohio). The power supply output was controlled from 0 to 8 amps. The UV LED polymerization section was supplied with 100 cubic feet/hour (46.7 liters/min) of nitrogen from a downstream (i.e. manifold 332 in FIG. 3C) gas introduction device which resulted in approximately 150 ppm oxygen concentration in the controlled environment.

Following the UV LED polymerization, the coated web passed a 10 ft (3 m) span in the room environment, and then passed through two 5 ft (1.5 m) long sections of small gap drying with plate temperatures set at 170° F. (77° C.). The coating was then post-polymerized using a Fusion Systems Model 1300P (Gaithersburg Md.) fitted with an H-bulb. The UV chamber was nitrogen-inerted to approximately 50 ppm oxygen.

Figure 5:
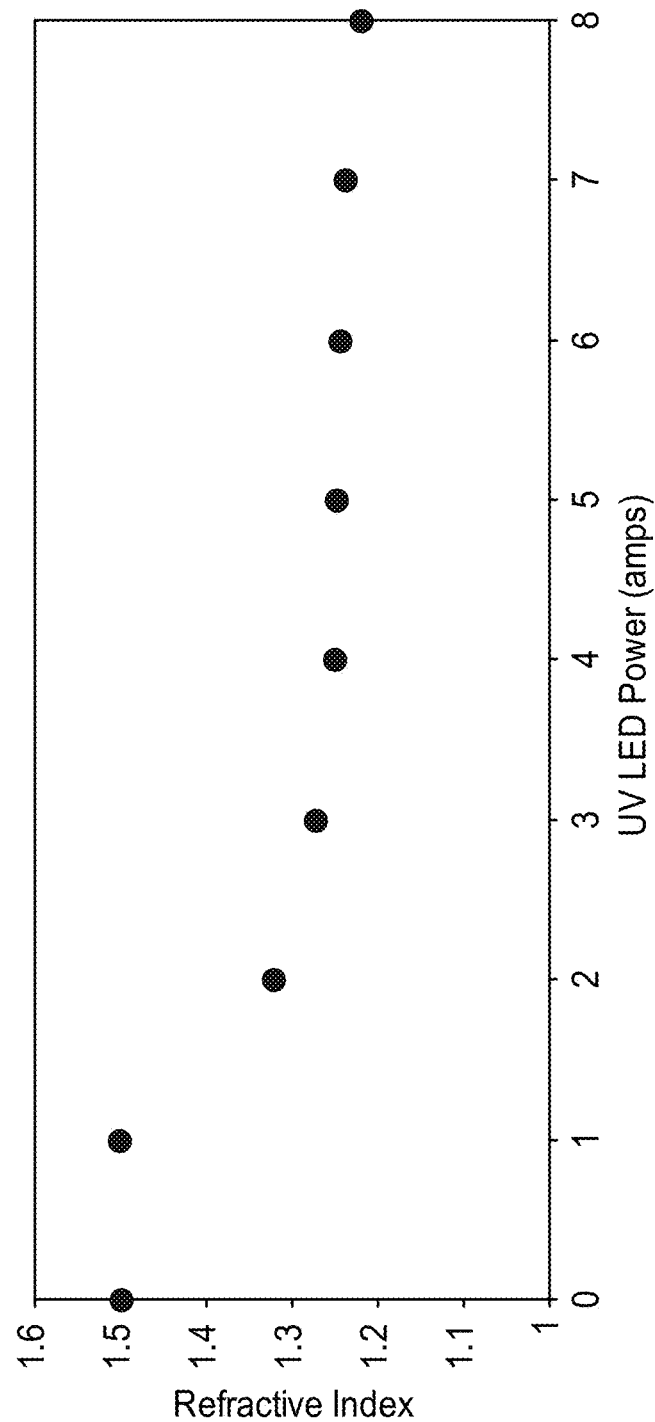
FIG. 5 is a plot of refractive index versus UV LED power.

Nine samples were prepared to demonstrate control of the nanoporosity and the coating refractive index, by varying the UV LED power supply from 0 to 8 amps in 1 amp increments. The refractive indices of the 9 coatings were measured at 632.8 nm using a Metricon MODEL 2010 prism coupler (Metricon Corporation Inc., Pennington, N.J.), and the results were plotted in FIG. 5. With power levels less than about 1 amp, the final coating morphology did not change and the refractive index (n=1.49) was that expected of 906 Hardcoat after sequential coating, drying, and curing. With increasing power level, the refractive index progressively drops reaching a minimum value (n=1.22) at a power setting of 8 amps.

Using the volume average relationship presented in Example 1, the calculated volume fraction of air in the film having the measured refractive of 1.22 is 0.56. This example shows the amount of air in the coating can be varied from 0 to 56%, by controlling the polymerization conditions.

Example 3

Demonstration of High Volume Low Cost Roll-to-Roll Manufacturing

The 35% solids 906 Hardcoat solution from Example 2 was further diluted to 30% solids with the addition of ethyl acetate. Irgacure 819 was then added at 2% by weight of solids. The coating solution was applied to a 0.002 inch (0.051 mm) thick primed polyester (Melinex 617, DuPont Teijin Films) substrate web, in the process shown in FIGS. 3A-3C.

The first coating solution was supplied to an 8 inch (20.3 cm) wide slot type coating die, onto a web moving at a speed that was varied from 20 to 100 ft/min (6.1 to 30.5 m/min). The rate of application of the coating solution was increased as the web speed was increased to maintain a constant wet coating thickness of 19 microns. After coating, the web passed through a web enclosure (i.e., shroud 308 in FIG. 3A) before entering a 5 ft (152 cm) long section of Gap dryer (corresponds to the coating conditioning region 309 in FIG. 3A). The Gap dryer was operating with a 0.25 inch (0.64 cm) gap and both upper and lower plates set at 70° F. (21° C.), conditions set to minimize drying between the coating die and polymerization section. The UV LED polymerization apparatus was directly coupled with the downweb end of the Gap dryer.

The coated web then passed into the polymerization section which used a 395 nm UV LED water-cooled array consisting of 16 rows of LEDs with 22 LEDs in each row. The 22 LEDs in each row were equally spaced across the web width, and the 16 rows were equally spaced along the downweb direction in an area of 8"×8" (20.3×20.3 cm). The 352 LEDs in the array were 395 nm UV LEDs (available from Cree Inc., Durham N.C.). The LED array was powered using a LAMBDA GENH750 W power supply. The power supply output can be varied from 0 to 13 amps and operated at approximately 45 volts. The controlled environment was supplied with approximately 300 cubic feet/hour (140 liters/min) of nitrogen from two downstream gas introduction devices (e.g., manifold 332 in FIG. 3C). This resulted in approximately 140 ppm oxygen concentration in the controlled environment of the polymerization section. After exiting the apparatus, the web traveled approximately 3 ft (0.9 m) before entering a 30 ft (9.1 m) conventional air floatation drier with all 3 zones set at 150° F. (66 C). After drying and before winding, the polymerized and dried coating was post-polymerized using a Fusion UV Systems, Inc. VPS/I600 (Gaithersburg, Md.). The Fusion system was configured with an H-bulb and was operated 100% power at less than 50 ppm oxygen in the cure zone.

Figure 6:
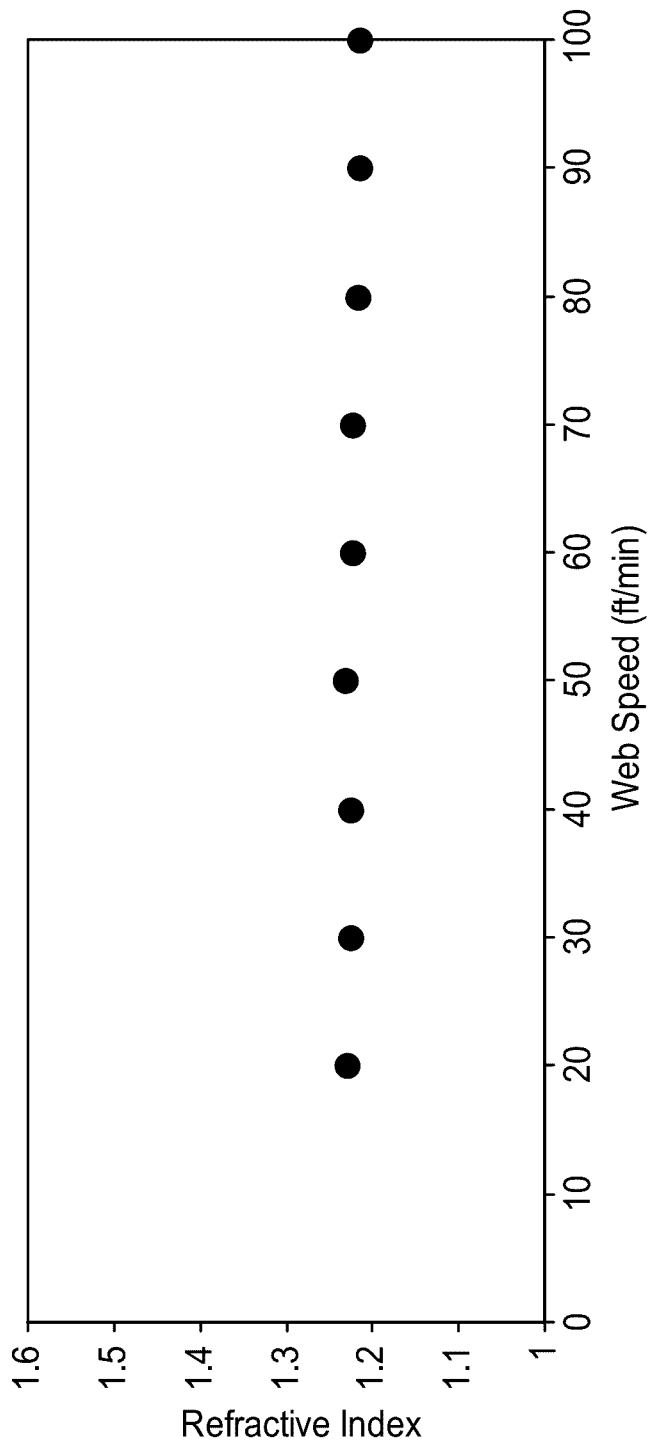
FIG. 6 is a plot of refractive index versus web speed.

The refractive indices of the post-polymerized coatings that were prepared at different web speeds were measured at 632.8 nm using a Metricon MODEL 2010 prism coupler (Metricon Corporation Inc., Pennington, N.J.). FIG. 6 shows the effect of web speed on measured refractive index for constant coating thickness and a constant UV LED power setting of 13 amps. The results show the refractive index remains essentially constant (n=1.22) over the entire speed range, from 20 to 100 ft/min (6.1 to 30.5 m/min). The flow rate varied at each speed, ranging from 24 cc/min coating solution flow rate at 20 ft/min web speed, to 120 cc/min coating solution flow rate at 100 ft/min web speed.

Figure 7:
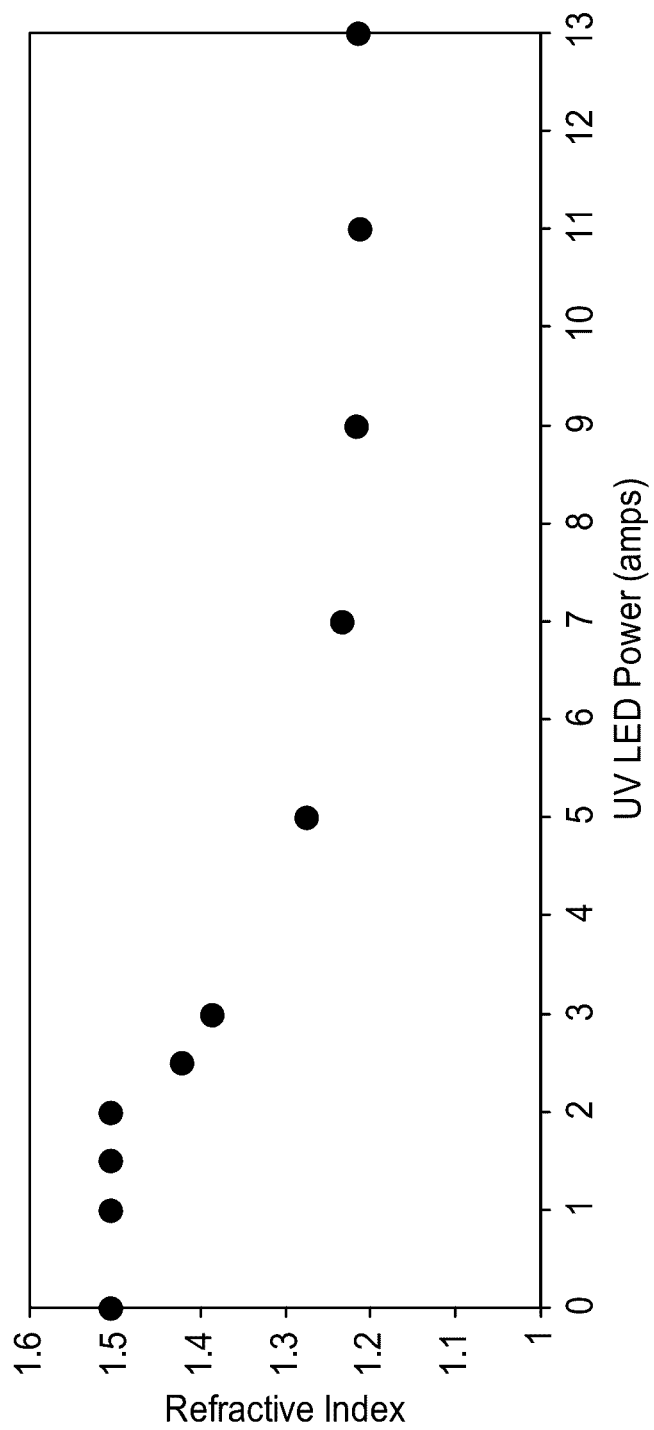
FIG. 7 is a plot of refractive index versus UV LED power.

FIG. 7 shows the refractive index versus the UV LED power range for a constant web speed of 100 ft/min (30.5 m/min), and a coating solution flow rate of 120 cc/min. With power levels less than about 2 amp, the final coating morphology did not change and the refractive index (n=1.5) was that expected of 906 Hardcoat after sequential coating, drying, and curing. However with increasing power level, the refractive index progressively dropped reaching a minimum value (n=1.21) at a power setting above 9 amps.

Example 4

Effect of Polymerization Chamber $O_2$ Concentration on Refractive Index

The process described in Example 3 was repeated, with the following exceptions: the samples were coated at a speed of 100 ft/min (30.5 m/min), a coating solution flow rate of 120 cc/min, and 13 amp UV LED power was used. The effect of polymerization section oxygen concentration for two different nitrogen flow conditions was determined. The first condition, with a nitrogen flow rate of 300 cubic feet/hour (140 liters/min) and a resulting oxygen concentration of 140 ppm, produced a coating having a refractive index of 1.21. The second condition, with a nitrogen flow rate of 100 cubic feet/hour (46.7 liters/min) and a resulting oxygen concentration of >10,000 ppm, produced a coating having a refractive index of 1.45.

Example 5

Effect of Solvent Content of First Solution

Preparation of Modified Nanoparticle Dispersion:

In a 2 L three neck flask, equipped with a condenser and a thermometer, 360 g of Nalco 2327 colloidal silica (40% wt solid) and 300 g of 1-methoxy-2-propanol were mixed together under rapid stirring. After that, 22.15 g of Silquest A-174 silane was added, the mixture was stirred for 10 minutes, and 400 g of additional 1-methoxy-2-propanol was added. The mixture was heated 85° C. using a heating mantle for 6 hours. The resulting solution was allowed to cool down to room temperature. Most of the water/1-methoxy-2-propanol solvents (about 700 g) was removed using a rotary evaporator under a 60° C. water-bath, resulting in a 44% wt A-174 modified 20 nm silica clear dispersion in 1-methoxy-2-propanol.

Figure 8:
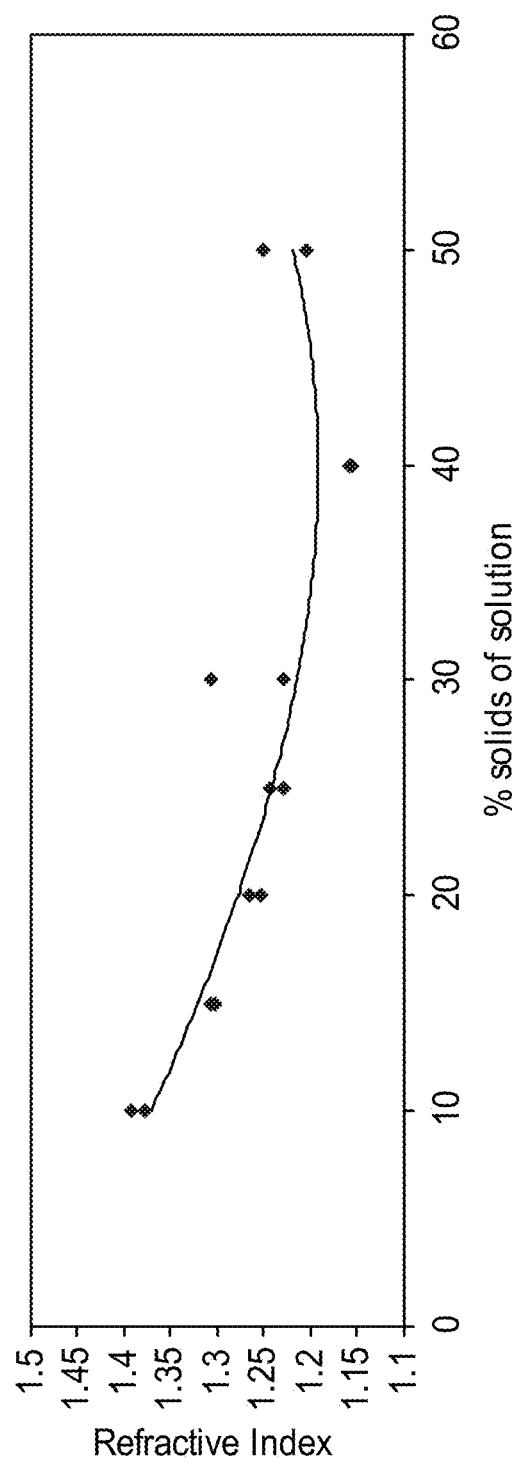
FIG. 8 is a plot of refractive index versus percent solids.

Preparation of Coating Solutions:

70.1 g of the A-174 modified silica dispersion and 20.5 g of SR 444 were mixed together by stirring, to form a homogenous coating solution of 56.6% solids solution in 1-methoxy-2-propanol. Several different dilutions of the homogenous coating solution were prepared, ranging from 10% solids to 50% solids. Each dilution included 2% (by weight) of the photoinitiator Irgacure 184 and was diluted using a 2:1 mixture of IPA/Dowanol™ PM. Each of the first coating dilutions was processed using the 16×22 array of 395 nm UV LED apparatus of Example 3, under the same process conditions as described in Example 2, at a UV LED power of 13 amps, with the exception that the nitrogen flow rate was 75 cubic feet/hour (35 liters/min). The refractive index of each of the polymerized coatings was measured as described elsewhere, and the results plotted in FIG. 8.

Although not wishing to be bound by theory, it appears that at low percent solids the insoluble polymer matrix does not have enough cured polymer for mechanical integrity, so shrinkage and densification occurs as the film dries; at high percent solids, there may not be sufficient solvent to make sufficient nanovoids necessary to result in a low index coating.

Example 6

Effect of Coating Thickness and UV Dose

Preparation of Coating Solution:

The modified nanoparticle dispersion of Example 5 (A-174 silica dispersion) was prepared. 70.1 g of the A-174 silica dispersion, 20.5 g of SR 444, 1.1 g of Irgacure 184, and 80.4 g of isopropyl alcohol were mixed together by stirring to form a homogenous 30% solids (by weight) coating solution.

Figure 9:
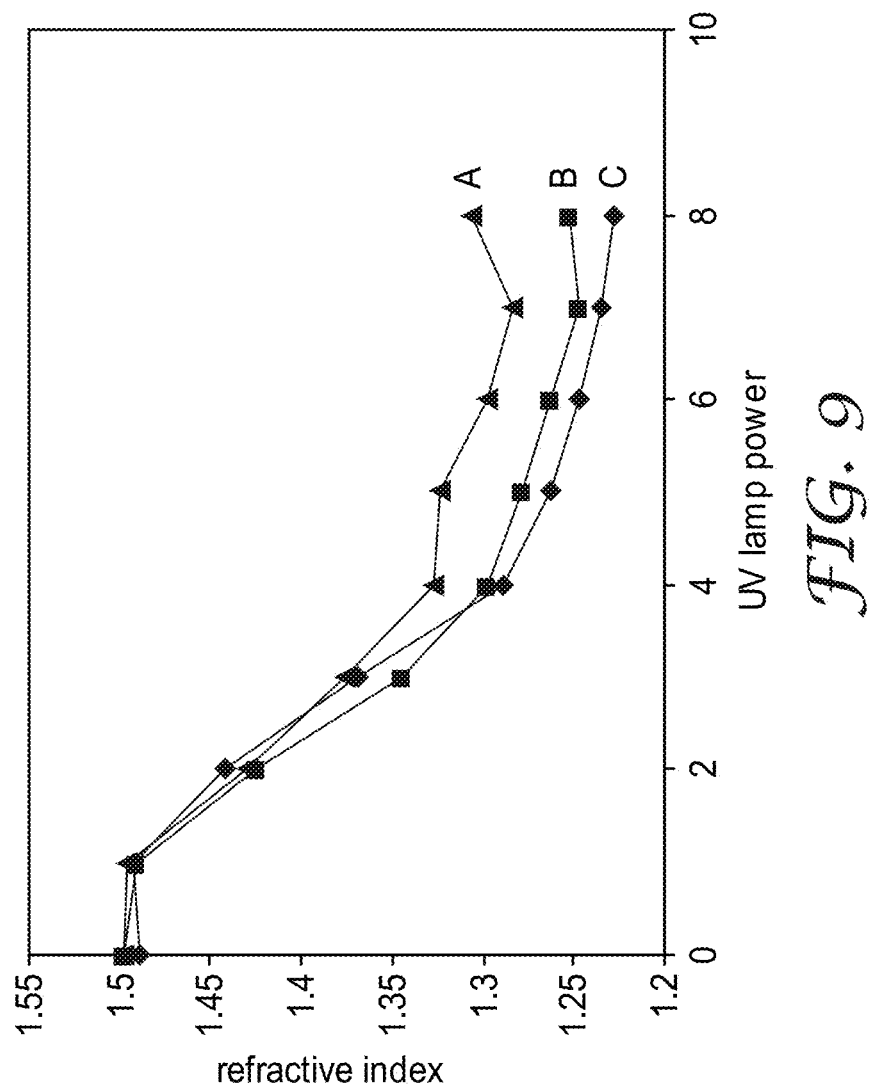
FIG. 9 is a plot of refractive index versus UV LED power.

Several different coatings were prepared by changing the flow rate of the first coating solution, resulting in wet coating thicknesses of 9.7 microns (coating A), 12.9 microns (coating B), and 19.3 microns (coating C). Each of the coatings were processed using the 8×20 array of 385 nm UV LED apparatus under the same conditions as described in Example 2, at a UV LED power varied in 1-amp increments from 0 to 8 amps. The refractive index of each of the polymerized coatings was measured as described elsewhere. The results are plotted in FIG. 9, showing the refractive index of each of the coatings as a function of UV lamp power.

Example 7

Effect of Photoinitiator Concentration

Figure 10:
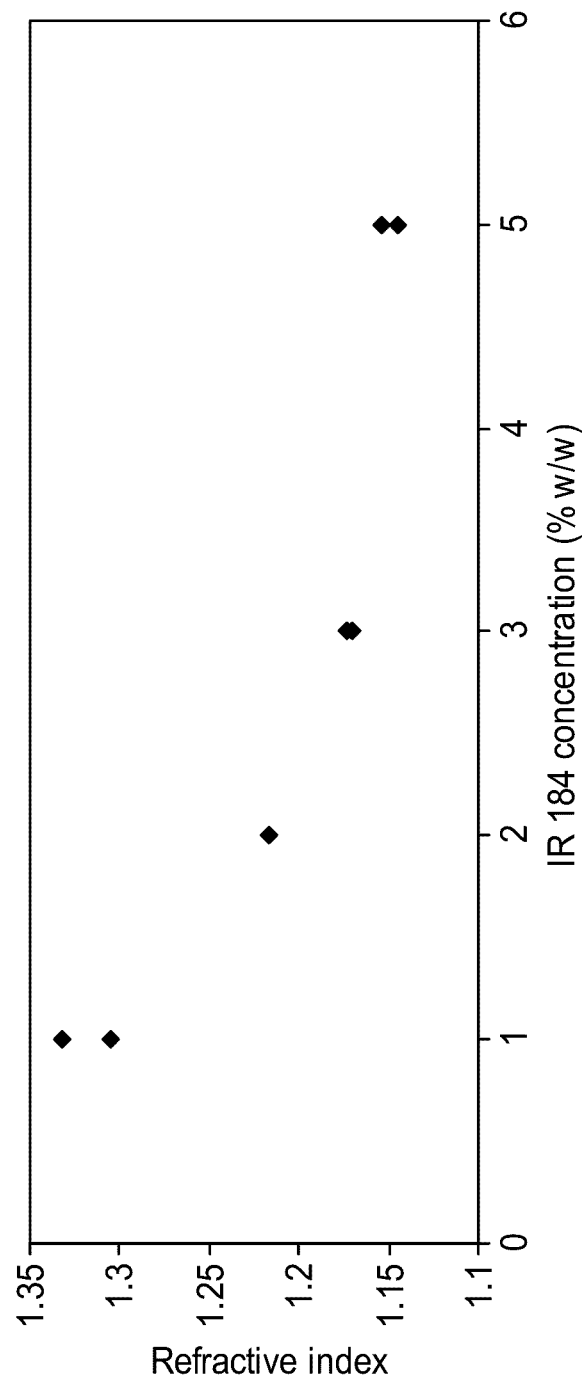
FIG. 10 is a plot of refractive index versus photoinitiator concentration.

The coating solution of Example 6 was prepared, with the exception that the Irgacure 184 concentration was varied from 1% to 5% by weight of solids, in 1% increments, to form five different coating solutions. The flow rate of each of the coating solutions was set to provide a wet coating thicknesses of 16 microns. Each of the coatings were processed using the 16×22 array of 395 nm UV LED apparatus of Example 3, under the same conditions as described in Example 2, and, at a UV LED power of 13 amps. The refractive index of each of the polymerized coatings was measured at each of the photoinitiator levels, as described elsewhere. The results are plotted in FIG. 10, showing the refractive index of the coatings as a function of photoinitiator concentration.

Example 8

Effect of UV LED Dose

The coating solution of Example 5 was prepared, with the exception that the homogeneous coating solution was diluted using a 2:1 mixture (by weight) of IPA/DOWANOL™ PM to 25% solids by weight (the photoinitiator remained Irgacure 184 at 2% by weight of solids). The flow rate of each of the coating solutions was set to provide a wet coating thickness of 16 microns. A series of constant speed (CS) samples was processed using the 16×22 array of 395 nm UV LED apparatus of Example 3, under the same conditions as described in Example 2, at a web speed of 5 feet/min, and the UV LED power was changed from 1 to 13 amps in 1 amp increments. A second series of constant dose (CD) samples was processed using the 16×22 array of 395 nm UV LED apparatus of Example 3, under the same conditions as described in Example 2, but as the UV LED power was changed from 1 to 13 amps in 1 amp increments. For the CD samples, the web was stopped under the LEDs so that the coating experienced the same UV dose. The UV dose was measured using a High Energy UV Integrating Radiometer (Power Puck®, available from EIT Inc., Sterling Va.), and the results are shown in Table 2, along with the time that the web was stopped under the LEDs for constant dose.

TABLE 2

| Setting (Amps) | UV-A (J/cm²) | UV-C (J/cm²) | Visible (J/cm²) | Time Stopped under LEDs (sec) |
| --- | --- | --- | --- | --- |
| 1 | 0.0104 | 0.0005 | 0.07172 | 104 |
| 2 | 0.0208 | 0.001 | 0.14344 | 52 |
| 3 | 0.0312 | 0.0015 | 0.21516 | 34.6 |
| 4 | 0.0416 | 0.002 | 0.28688 | 26 |
| 5 | 0.052 | 0.0025 | 0.3586 | 20.8 |
| 6 | 0.0624 | 0.003 | 0.43032 | 17.3 |
| 7 | 0.0728 | 0.0035 | 0.50204 | 14.8 |
| 8 | 0.0832 | 0.004 | 0.5736 | 13 |
| 9 | 0.0936 | 0.0045 | 0.64548 | 11.5 |
| 10 | 0.104 | 0.005 | 0.7172 | 10.4 |
| 11 | 0.1144 | 0.0055 | 0.78892 | 9.5 |
| 12 | 0.1248 | 0.006 | 0.86064 | 8.6 |
| 13 | 0.1352 | 0.0065 | 0.93236 | 8 |

Figure 11:
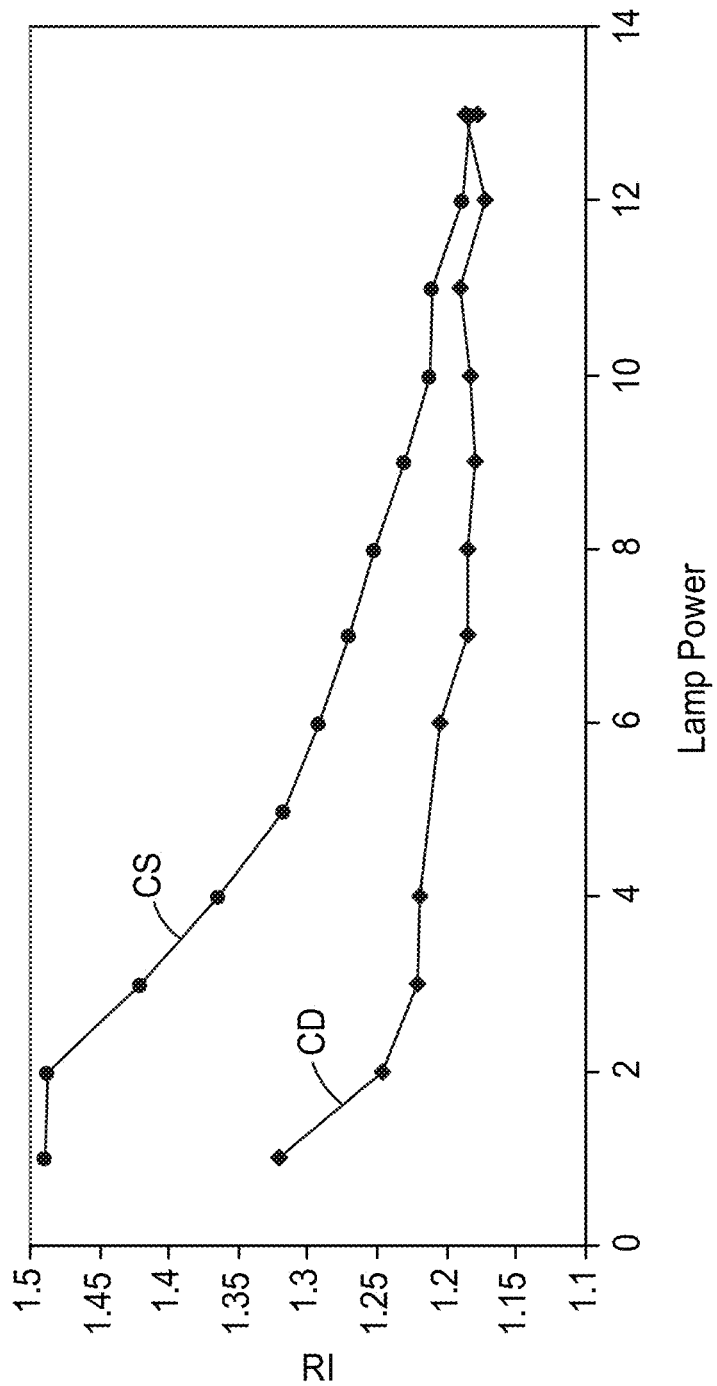
FIG. 11 is a plot of refractive index versus UV LED power.

The refractive index of each of the polymerized coatings was measured at each of the UV dose levels, as described elsewhere. The results are plotted in FIG. 11, showing the refractive index of the coatings as a function of UV LED power for constant dose (CD) and constant speed (CS) samples. Due to inerting of the UV chamber, drying and curing can occur simultaneously in this Example.

Example 9

Nanovoided Coating without Addition of Nanoparticles

Figure 12:
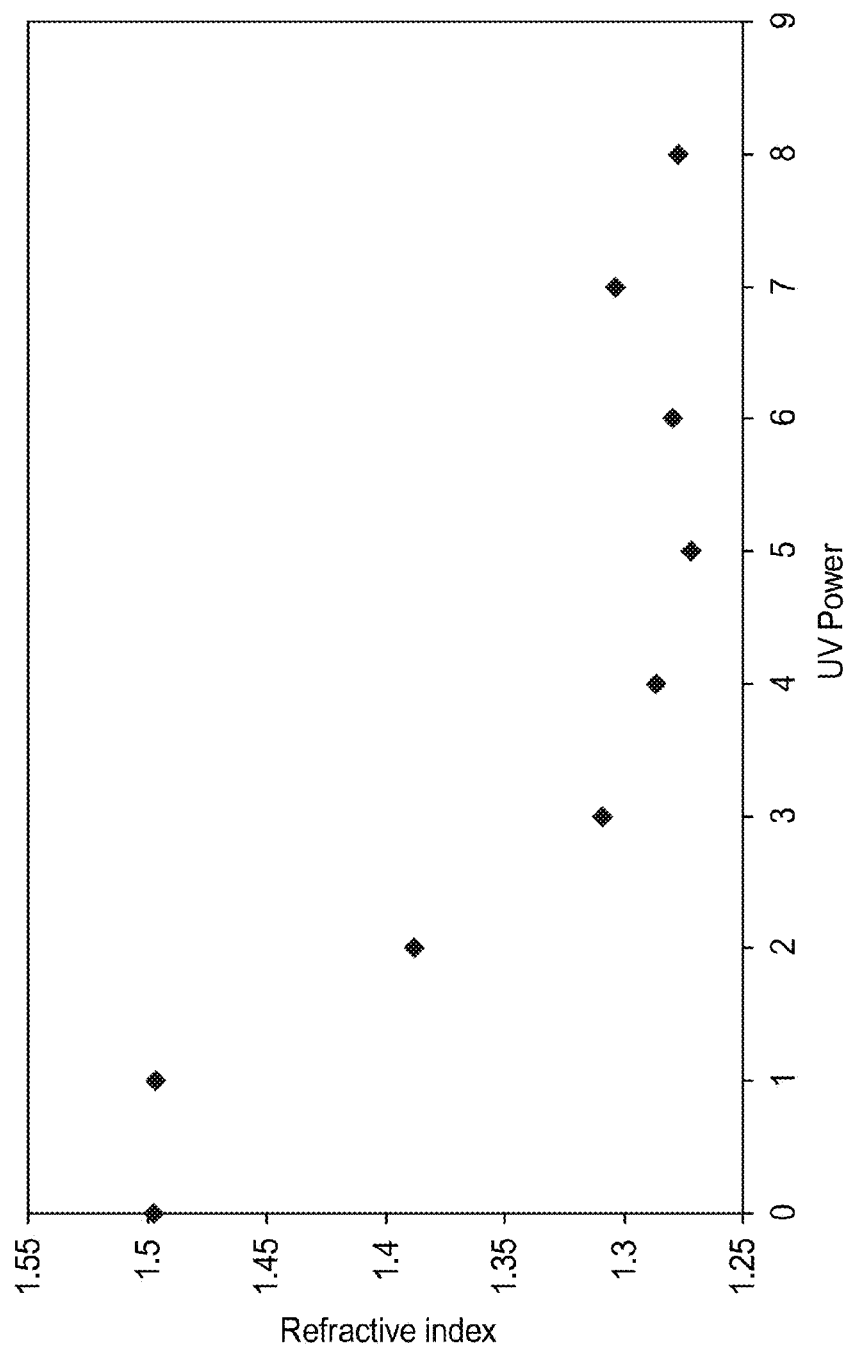
FIG. 12 is a plot of refractive index versus UV LED power.

A radiation curable resin (SR-444) was diluted using a 2:1 mixture (by weight) of IPA/DOWANOL™ PM to 30% solids by weight, and Irgacure 184 was added at 2% by weight of solids. The coatings were processed using the apparatus under the same conditions as described in Example 2, and the UV LED power was varied in 1-amp increments from 0 to 8 amps. The refractive index of each of the polymerized coatings was measured as described elsewhere. The results are plotted in FIG. 12, showing the refractive index of each of the coatings as a function of UV lamp power.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A process for producing a nanovoided article, comprising:

providing a first solution comprising a polymerizable material in a solvent, wherein the first solution further comprises nanoparticles, and wherein a weight ratio of polymerizable material to the nanoparticles in the first solution is greater than about 30:70;

at least partially polymerizing the polymerizable material with ultraviolet (UV) radiation produced by at least one light emitting diode (LED) to form a composition comprising an insoluble polymer matrix substantially bicontinuous with a second solution, wherein the insoluble polymer matrix comprises a plurality of nano-voids that are filled with the second solution, and wherein at least some of the nanoparticles are bound to the insoluble polymer matrix during the polymerizing step; and removing a major portion of the solvent from the second solution.

2. The process of claim 1, wherein the polymerizable material comprises a crosslinkable material, and at least partially polymerizing comprises crosslinking the crosslinkable material.

3. The process of claim 1, wherein the solvent comprises an organic solvent.

4. The process of claim 1, wherein the solvent comprises a blend of at least two organic solvents.

5. The process of claim 1, wherein removing a major portion of the solvent comprises drying in a thermal oven, drying with infrared light sources, vacuum drying, gap drying, or a combination thereof.

6. The process of claim 1, wherein a weight percent solids of the first solution is greater than about 5% and less than about 90%.

7. The process of claim 1, wherein a weight percent solids of the first solution is greater than about 10% and less than about 60%.

8. The process of claim 1, wherein a weight percent solids of the first solution is greater than about 30% and less than about 40%.

9. The process of claim 1, wherein the nanoparticles comprise surface modified nanoparticles.

10. The process of claim 9, wherein the surface modified nanoparticles comprise reactive nanoparticles, non-reactive nanoparticles, or combinations thereof.

11. The process of claim 10, wherein a substantial portion of the reactive nanoparticles form a chemical bond with the insoluble polymer matrix.

12. The process of claim 10, wherein a substantial portion of the non-reactive nanoparticles form a physical bond with the insoluble polymer matrix.

13. The process of claim 1, wherein a weight ratio of the polymerizable material to the nanoparticles ranges greater than 30:70 to about 90:10.

14. The process of claim 1, wherein the first solution further comprises a photoinitiator.

15. The process of claim 1, wherein the at least one LED comprises a peak wavelength at 365, 385, 395 or 405 nanometers.

* * * * *